US 11,291,914 B2

(12) United States Patent
Morishita

(10) Patent No.: US 11,291,914 B2
(45) Date of Patent: Apr. 5, 2022

(54) PROCESSING DEVICE, PROGRAM, AND METHOD

(71) Applicant: GungHo Online Entertainment, Inc., Tokyo (JP)

(72) Inventor: Kazuki Morishita, Tokyo (JP)

(73) Assignee: GungHo Online Entertainment, Inc.

(*) Notice: Subject to any disclaimer, the term of this patent is extended or adjusted under 35 U.S.C. 154(b) by 30 days.

(21) Appl. No.: 16/929,252

(22) Filed: Jul. 15, 2020

(65) Prior Publication Data

US 2021/0252400 A1 Aug. 19, 2021

Related U.S. Application Data

(63) Continuation of application No. PCT/JP2020/006113, filed on Feb. 17, 2020.

(51) Int. Cl.
*A63F 13/56* (2014.01)
*A63F 13/65* (2014.01)
(Continued)

(52) U.S. Cl.
CPC .............. *A63F 13/56* (2014.09); *A63F 13/58* (2014.09); *A63F 13/65* (2014.09); *A63F 13/822* (2014.09)

(58) Field of Classification Search
CPC .......... A63F 13/56; A63F 13/58; A63F 13/65; A63F 13/822
See application file for complete search history.

(56) References Cited

U.S. PATENT DOCUMENTS 4,337,948 A * 7/1982 Breslow .............. A63F 3/00643
273/237
4,372,558 A * 2/1983 Shimamoto ......... A63F 3/00643
463/41
(Continued)

FOREIGN PATENT DOCUMENTS

JP 2010-277121 A 12/2010
JP 2016-105272 A 6/2016
(Continued)

OTHER PUBLICATIONS

[FE Musou] System, [FE Musou] Walkthrough for Fire Emblem Musou, <https://wiki.denfaminicogamer.jp/femusou/>, display from Apr. 28, 2020, (11 pages).

*Primary Examiner* — David L Lewis
*Assistant Examiner* — Matthew D Hoel
(74) *Attorney, Agent, or Firm* — Harness, Dickey & Pierce, P.L.C.

(57) ABSTRACT

A processing device including: an input interface to receive an arrangement position of a player character in a virtual game space; a memory configured to store computer readable instructions; and a processor. The processor is configured to execute the computer readable instructions so as to: arrange the player character and the another character based on the arrangement positions stored in the memory; change the arrangement position of the player character to a new arrangement position when the input interface receives a movement instruction for the player character; and form a group including the player character and the another character when the player character and the another character are arranged within a predetermined range in the virtual game space after one of the arrangement position of the player character or the arrangement position of the another character is changed in the virtual game space.

12 Claims, 18 Drawing Sheets

(51) Int. Cl.
*A63F 13/58* (2014.01)
*A63F 13/822* (2014.01)

(56) References Cited

U.S. PATENT DOCUMENTS

| | | | | |
|---|---|---|---|---|
| 4,938,483 A * | 7/1990 | Yavetz | A63H 30/04 273/454 |
| 5,184,830 A * | 2/1993 | Okada | A63F 13/10 463/29 |
| 5,396,225 A * | 3/1995 | Okada | A63F 13/12 463/40 |
| 5,428,528 A * | 6/1995 | Takenouchi | A63F 13/12 463/42 |
| 5,618,045 A * | 4/1997 | Kagan | A63F 13/12 463/40 |
| 5,691,885 A * | 11/1997 | Ward | H01R 13/514 361/735 |
| 5,702,305 A * | 12/1997 | Norman | A63F 9/24 463/42 |
| 5,738,583 A * | 4/1998 | Comas | A63F 13/12 463/40 |
| 5,966,526 A * | 10/1999 | Yokoi | A63F 13/005 703/11 |
| 6,165,068 A * | 12/2000 | Sonoda | A63F 13/12 463/8 |
| 6,254,481 B1 * | 7/2001 | Jaffe | A63F 13/10 463/20 |
| 6,287,200 B1 * | 9/2001 | Sharma | A63F 13/12 463/40 |
| 6,626,756 B2 * | 9/2003 | Sugimoto | A63F 13/10 463/4 |
| 6,659,860 B1 * | 12/2003 | Yamamoto | A63F 13/06 463/1 |
| 6,674,995 B1 * | 1/2004 | Meyers | A63F 13/12 455/41.2 |
| 6,687,128 B2 * | 2/2004 | Tokuhara | G06F 1/181 361/679.4 |
| 6,795,318 B2 * | 9/2004 | Haas | H04M 1/0254 361/728 |
| 6,811,487 B2 * | 11/2004 | Sengoku | A63F 13/12 463/42 |
| 7,179,171 B2 * | 2/2007 | Forlines | A63F 13/12 463/41 |
| 7,184,718 B2 * | 2/2007 | Newman | G06F 1/1671 455/90.3 |
| 7,233,988 B2 * | 6/2007 | Minakuchi | H04W 8/005 709/213 |
| 7,371,177 B2 * | 5/2008 | Ellis | A63F 13/12 463/42 |
| 8,602,833 B2 * | 12/2013 | Binder | A63F 9/1011 446/124 |
| 8,742,814 B2 * | 6/2014 | Binder | H01R 9/16 327/261 |
| 8,951,088 B2 * | 2/2015 | Binder | A63F 9/1011 446/124 |
| 9,293,916 B2 * | 3/2016 | Binder | A63F 9/24 |
| 9,356,383 B2 * | 5/2016 | Waffenschmidt | H01R 13/514 |
| 9,419,378 B2 * | 8/2016 | Bdeir | H01R 13/6205 |
| 9,559,519 B2 * | 1/2017 | Binder | A63F 13/211 |
| 9,583,940 B2 * | 2/2017 | Binder | H04R 3/00 |
| 9,586,139 B2 * | 3/2017 | Jabara | A63F 13/332 |
| 9,590,420 B2 * | 3/2017 | Binder | G09B 17/003 |
| 9,595,828 B2 * | 3/2017 | Binder | H04R 3/00 |
| 9,597,607 B2 * | 3/2017 | Bdeir | A63H 33/26 |
| 9,662,571 B1 * | 5/2017 | Jabara | A63F 13/332 |
| 9,673,623 B2 * | 6/2017 | Binder | A63H 33/26 |
| 9,831,599 B2 * | 11/2017 | Bdeir | H01R 11/30 |
| 9,855,500 B2 * | 1/2018 | Jabara | A63F 13/327 |
| 10,155,153 B2 * | 12/2018 | Binder | A63F 9/10 |
| 10,158,227 B2 * | 12/2018 | Binder | A63H 5/00 |
| 10,164,427 B2 * | 12/2018 | Binder | A63F 13/54 |
| 10,177,568 B2 * | 1/2019 | Binder | G09B 5/06 |
| 10,230,237 B2 * | 3/2019 | Binder | A63H 33/08 |
| 10,244,630 B2 * | 3/2019 | Bdeir | A63H 33/046 |
| 10,256,568 B2 * | 4/2019 | Bdeir | H01R 13/6205 |
| 10,322,351 B2 * | 6/2019 | Marr | G07F 17/3272 |
| 10,355,476 B2 * | 7/2019 | Binder | A63F 13/211 |
| 10,396,552 B2 * | 8/2019 | Binder | G09B 19/025 |
| 10,447,034 B2 * | 10/2019 | Binder | H01R 13/7175 |
| 10,569,181 B2 * | 2/2020 | Binder | H01R 13/7177 |
| 10,589,183 B2 * | 3/2020 | Binder | A63F 13/211 |
| 10,617,964 B2 * | 4/2020 | Binder | A63H 33/26 |
| 10,706,680 B2 * | 7/2020 | Warner | G06Q 40/02 |
| 10,758,832 B2 * | 9/2020 | Binder | A63H 33/26 |
| 10,864,450 B2 * | 12/2020 | Binder | H04W 4/80 |
| 10,981,074 B2 * | 4/2021 | Binder | H02J 1/001 |
| 10,987,571 B2 * | 4/2021 | Binder | A63F 9/24 |
| 11,014,013 B2 * | 5/2021 | Binder | G09B 5/06 |
| 11,027,211 B2 * | 6/2021 | Binder | B25J 9/1656 |
| 11,040,282 B2 * | 6/2021 | Knutsson | A63F 13/537 |
| 2001/0044339 A1 * | 11/2001 | Cordero | A63F 13/34 463/42 |
| 2002/0006825 A1 * | 1/2002 | Suzuki | A63F 13/12 463/40 |
| 2005/0176486 A1 * | 8/2005 | Nishimura | A63F 13/426 463/4 |
| 2006/0003823 A1 | 1/2006 | Zhang et al. | |

FOREIGN PATENT DOCUMENTS

| | | |
|---|---|---|
| JP | 2016-214414 A | 12/2016 |
| JP | 2017-047028 A | 3/2017 |
| JP | 2018-038555 A | 3/2018 |

* cited by examiner

| PLAYER ID | PLAYER NAME | PLAYER CHARACTER | LEVEL |
|---|---|---|---|
| U1 | N1 | C1 | L1 |
| U2 | N2 | C2 | L2 |
| U3 | N3 | C3 | L3 |
| U4 | N4 | C4 | L4 |
| U5 | N5 | C5 | L5 |
| ... | ... | ... | ... |

FIG. 5B

| CHARACTER ID | ATTRIBUTE | ARRANGEMENT COORDINATE | HIT POINT | OFFENSIVE POWER | DEFENSIVE POWER | SKILL | GROUP SKILL |
|---|---|---|---|---|---|---|---|
| C1 | A1 | (X1,Y1) | 300 | 50 | 100 | S1 | W1 |
| C2 | A2 | (X2,Y2) | 250 | 100 | 20 | S2 | W2 |
| C3 | A3 | (X3,Y3) | 520 | 20 | 5 | S3 | W3 |
| C4 | A1 | (X4,Y4) | 250 | 250 | 50 | S4 | W4 |
| C5 | A2 | (X5,Y5) | 400 | 120 | 300 | S5 | W5 |
| ... | ... | ... | ... | ... | ... | ... | ... |

FIG. 5C

| GROUP ID | CHARACTER ID | TIME | STATE |
|---|---|---|---|
| G1 | C1,C2 | T1 | NOT COMPLETED |
| G2 | C5,C6,C7 | T2 | COMPLETED |
| G3 | C9,C10 | T3 | NOT COMPLETED |
| G4 | C11,C12 | T4 | COMPLETED |
| G5 | C13,C14 | T5 | COMPLETED |
| ... | ... | ... | ... |

| CHARACTER ID | SIZE | CENTER COORDINATE | INTRA-GROUP CHARACTER |
|---|---|---|---|
| C1 | F2 | R1 | C2 |
| C2 | F2 | R2 | C1 |
| C3 | F1 | R3 | — |
| C4 | F1 | R4 | — |
| C5 | F3 | R5 | — |
| ... | ... | ... | ... |

PROCESSING DEVICE, PROGRAM, AND METHOD

CROSS-REFERENCE TO RELATED APPLICATIONS

The present application is a continuation application of International Application No. PCT/JP2020/006113, filed on Feb. 17, 2020, which is expressly incorporated herein by reference in its entirety.

BACKGROUND

1. Technical Field

The present disclosure relates to a processing device, a program, and a method for executing a game application advanced using arrangement position information of a player character or present location information of a player.

2. Related Art

There has been known a processing device for executing a game in which a plurality of characters (for example, a plurality of player characters) battles a common enemy character in a virtual game space. For example, Japanese Patent Publication No. 2018-38555 A describes a video game processing system for executing a game in which a plurality of users participates and player characters operated by the users combat a common enemy character called raid boss.

SUMMARY

Therefore, based on the technique explained above, the present disclosure provides, according to various embodiments, a processing device, a program, and a method that can execute a virtual game rich in idea using an arrangement position of a player character in a virtual space or a present location of a player in a real space.

According to an aspect of the present disclosure, there is provided "A processing device including: an input interface that receives an instruction for an arrangement position in a virtual game space of a player character associated with a player; a memory configured to store, in addition to a predetermined instruction command, the arrangement position of the player character and an arrangement position in the virtual game space of another character different from the player character; and a processor configured to arrange, based on the arrangement position of the player character and the arrangement position of the other character stored in the memory, the player character and the other character in the virtual game space, update and store the arrangement position of the player character when receiving, with the input interface, an instruction to move the arrangement position of the player character, and execute the instruction command stored in the memory in order to form a group between the player character and the other character when the player character and the other character are arranged within a predetermined range by at least one of the update of the arrangement position of the player character and update of the arrangement position of the other character".

According to an aspect of the present disclosure there is provided "A program for causing a computer including an input interface that receives an instruction for an arrangement position in a virtual game space of a player character associated with a player and a memory configured to store the arrangement position of the player character and an arrangement position in the virtual game space of another character different from the player character, to function as: a processor configured to arrange, based on the arrangement position of the player character and the arrangement position of the other character stored in the memory, the player character and the other character in the virtual game space, update and store the arrangement position of the player character when receiving, with the input interface, an instruction to move the arrangement position of the player character, and perform processing for forming a group between the player character and the other character when the player character and the other character are arranged within a predetermined range by at least one of the update of the arrangement position of the player character and update of the arrangement position of the other character".

According to an aspect of the present disclosure, there is provided "A method performed by, in a computer including an input interface that receives an instruction for an arrangement position in a virtual game space of a player character associated with a player and a memory configured to store, in addition to a predetermined instruction command, the arrangement position of the player character and an arrangement position in the virtual game space of another character different from the player character, a processor executing the instruction command, the method including: a step of arranging, based on the arrangement position of the player character and the arrangement position of the other character stored in the memory, the player character and the other character in the virtual game space; a step of updating and storing the arrangement position of the player character when receiving, with the input interface, an instruction to move the arrangement position of the player character; and a step of forming a group between the player character and the other character when the player character and the other character are arranged within a predetermined range by at least one of the update of the arrangement position of the player character and update of the arrangement position of the other character".

According to an aspect of the present disclosure, there is provided "A processing device including: a sensor configured to detect a present location of a player in a real space; a communication interface configured to receive information concerning a present location of another player different from the player; a memory configured to store, in addition to a predetermined instruction command, information concerning the present location of the player detected by the sensor and information concerning the present location of the other player received by the communication interface; and a processor configured to arrange, based on the information concerning the present location of the player and the information concerning the present location of the other player stored in the memory, a player character associated with the player and another player character associated with the other player in a virtual game space, update and store a present location of the player detected a new by the sensor when the player moves, and execute the instruction command stored in the memory in order to form a group between the player character and the other player character when the present location of the player and the present location of the other player are present within a predetermined range according to at least any one of movement of the player and movement of the other player".

According to various embodiments of the present disclosure, it is possible to provide a processing device, a program, and a method that can execute a virtual game rich in idea using an arrangement position of a player character in a virtual space or a present location of a player in a real space.

Note that the effect described above is only illustrative for convenience of explanation and is not limiting. It is also possible to achieve any effects described in the present disclosure and effects obvious for those skilled in the art in addition to the effect described above or instead of the effect described above.

BRIEF DESCRIPTION OF THE DRAWINGS

FIG. 5B is a diagram conceptually illustrating a character information table stored in the terminal device 100 according to the first embodiment of the present disclosure. FIG. 5C is a diagram conceptually illustrating a group information table stored in the terminal device 100 according to the first embodiment of the present disclosure.

DESCRIPTION OF EXEMPLARY EMBODIMENTS

Figure 1:
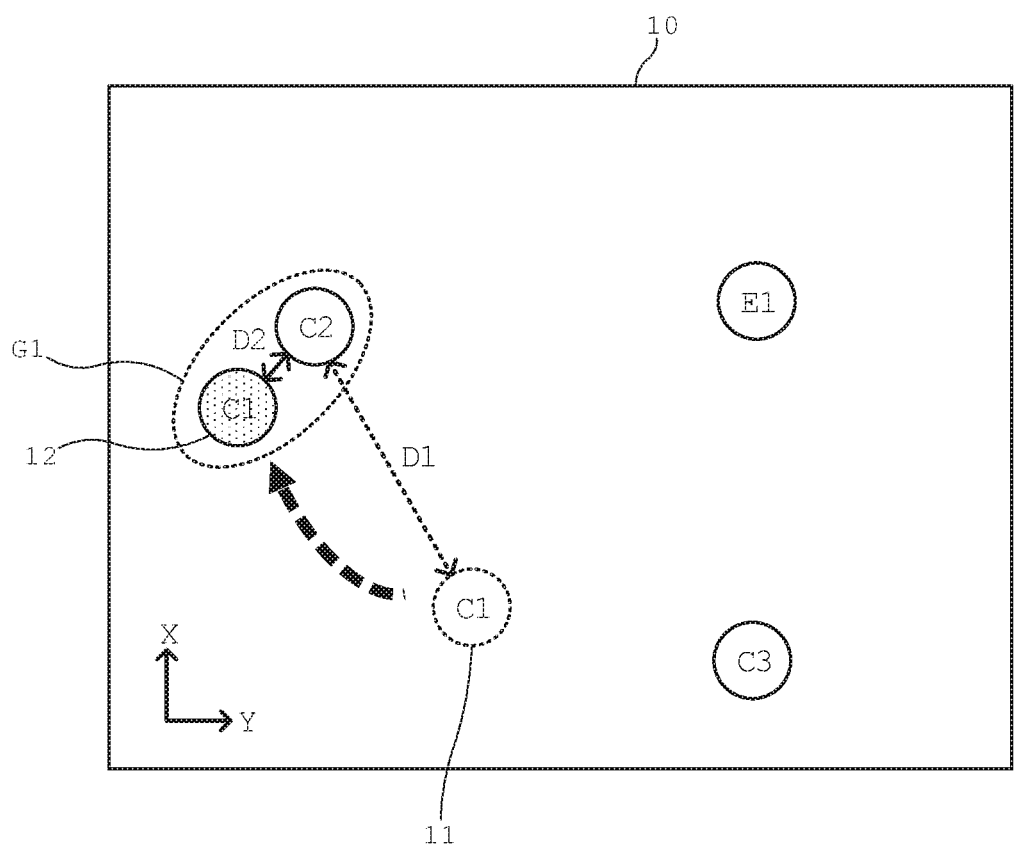
FIG. 1 is a diagram conceptually illustrating a virtual game space of a game application according to various embodiments of the present disclosure.

Various embodiments of the present disclosure are explained with reference to the accompanying drawings. Note that the same reference numerals and signs are given to common components in the drawings.

Overview of Application According to Present Disclosure

In game applications according to various embodiments of the present disclosure, it is possible to cause, based on an arrangement position of a player character in a virtual game space and a present location of a player in a real space, the player character and another character to form a group.

Typical examples of such game applications include applications of a battle game, a sports game, a role playing game, and the like between a plurality of characters including a player character and a plurality of enemy characters. In the following explanation, although not limited to a specific game application, an overview of an application according to the embodiments is explained using a battle game application as an example.

FIG. 1 is a diagram conceptually illustrating a virtual game space of a game application according to the various embodiments of the present disclosure. According to FIG. 1, a two-dimensional space spreading in an X-axis direction and a Y-axis direction from a predetermined origin is formed as a virtual game space 10. Note that, in a case explained below, the virtual game space 10 is formed as the two-dimensional space. However, the virtual game space 10 may be formed as a three-dimensional space and the like.

In the virtual game space 10, a player character C1 controllable by an instruction from a player is arranged in an arrangement position 11 and, in addition, characters C2 and C3 are arranged in predetermined arrangement positions. An enemy character E1 is arranged in a predetermined arrangement position as a common enemy of the player character C1, the character C2, and the character C3. At this time, the player character C1 arranged in the arrangement position 11 is apart from the character C2 by a distance D1. Therefore, in this state, the player character C1 and the character C2 do not form a group and each independently battle the enemy character E1.

Subsequently, when an instruction to move the player character C1 is received from the player, the player character C1 moves from the arrangement position 11 to an arrangement position 12. Then, the distance between the player character C1 and the character C2 changes to a distance D2, which is within a predetermined range (for example, a distance smaller than a threshold (a first threshold)). As a result, a group G1 is formed between the player character C1 and the character C2. When the group G1 is formed, the player character C1 and the character C2 forming the group G1 have improved ability values, can use special skills, and are capable of obtaining predetermined effects.

In an example illustrated in FIG. 1, the group is formed based on the distance between the characters in the virtual game space 10. However, a group can be formed based on the distance between a present location of a player and a present location of another player in a real space. The "group" simply means that other character is simply associated with a certain character. The certain character and the other character do not need to be associated with each other. That is, it is also possible that, from the viewpoint of the certain character, the certain character forms a group with the other character but, from the viewpoint of the other character, the other character does not form a group with the certain character.

In the present disclosure, a processing device includes both of a terminal device 100 and a server device 200. That is, it is possible to carry out processing according to the embodiments explained below in both of the terminal device 100 and the server device 200.

In the present disclosure, the other character forming the group with the player character C1 may be a non-player character controlled by a computer or may be a player character controlled by another player.

In the present disclosure, the distance between the player character C1 and the character C2 is, as an example, a distance from end portions of drawing areas of the characters but may be a distance from other positions such as the centers of the characters.

An effect obtained by forming the group is, as an example, a change of ability values of the characters but may be any ability values such as offensive power, hit points, defensive power, skills, and special skills. Examples of other effects include items usable when the group is formed, items, degrees of effects of which are changed by forming the group, and intra-game currency. Content of the effects may be effects advantageous for the player in advancing a virtual game or may be effects disadvantageous for the player.

First Embodiment

Figure 2:
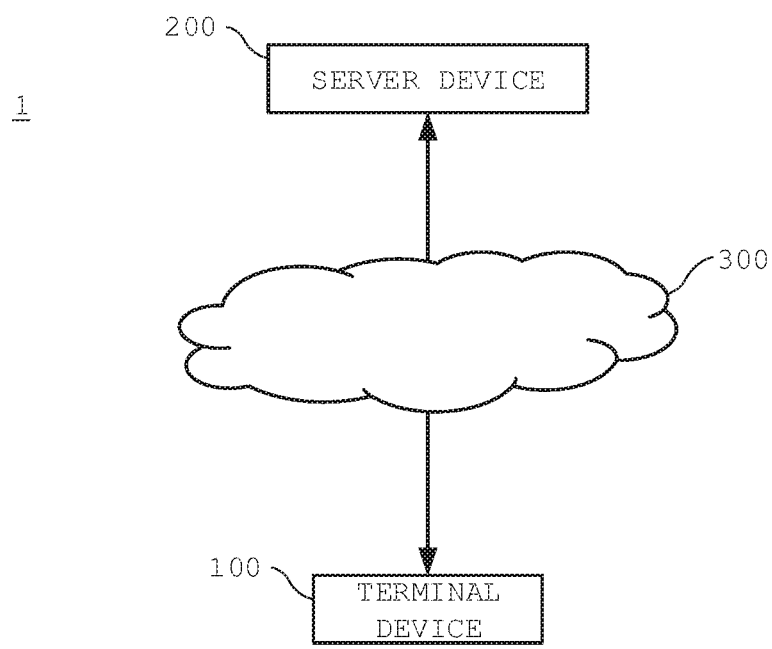
FIG. 2 is a conceptual diagram schematically illustrating a configuration of a system 1 according to a first embodiment of the present disclosure.

1. Configuration of System 1 According to First Embodiment of Present Disclosure FIG. 2 is a conceptual diagram schematically illustrating a configuration of a system 1 according to a first embodiment of the present disclosure. Referring to FIG. 2, the system 1 includes a terminal device 100 and a server device 200 communicably connected to the terminal device 100 through a network 300. In the system 1, the server device 200 and the terminal device 100 execute a program stored in a memory, whereby processing of a game application according to this embodiment is executed. The server device 200 and the terminal device 100 transmit and receive various kinds of information (for example, FIG. 5A and FIG. 5B), programs, and the like necessary for the progress of an application.

Note that, in an example illustrated in FIG. 2, only one terminal device 100 is illustrated. However, naturally, it is also possible to include two or more terminal devices 100. The server device 200 is illustrated as a single server device. However, it is also possible to distribute components and processing of the server device 200 to a plurality of server devices. Further, the game application according to this embodiment is executed by the system 1 including the server device 200 and the terminal device 100. However, it is also possible to execute the game application with only one terminal device 100 or a plurality of terminal devices without using the server device 200.

2. Configuration of Terminal Device 100

Figure 3:
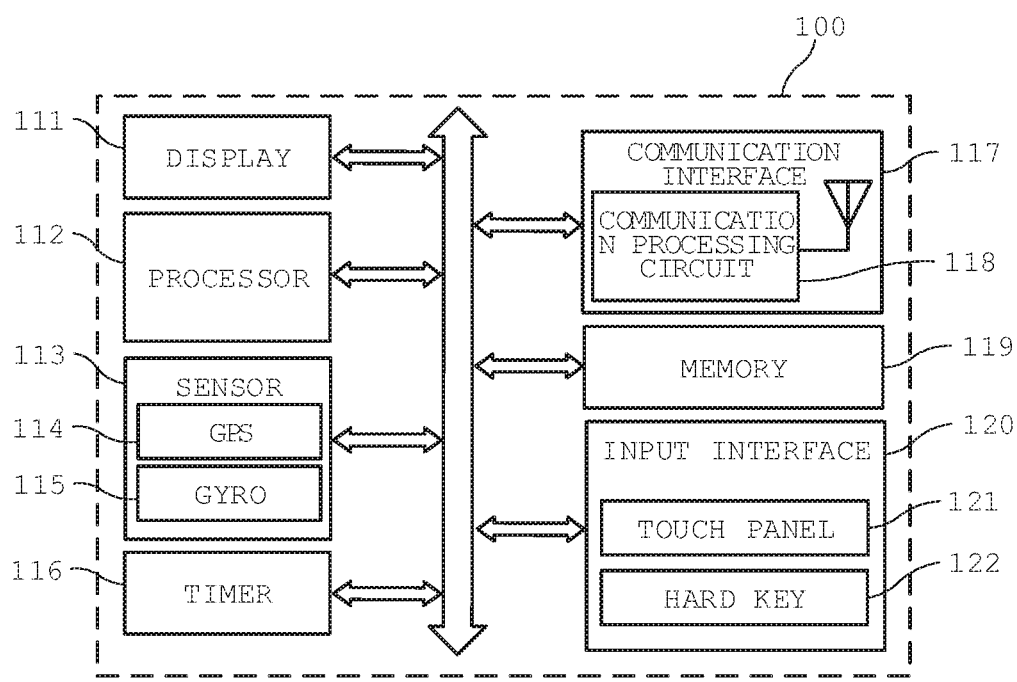
FIG. 3 is a block diagram illustrating an example of a configuration of a terminal device 100 according to the first embodiment of the present disclosure.

FIG. 3 is a block diagram illustrating an example of a configuration of the terminal device 100 according to the first embodiment of the present disclosure. The terminal device 100 does not need to include all components illustrated in FIG. 3. It is also possible to adopt a configuration in which a part of the components is omitted. It is also possible to add other components to the terminal device 100.

Examples of the terminal device 100 include a wirelessly communicable portable terminal device represented by a smartphone. However, besides, it is possible to suitably apply any device capable of executing the game application according to the present disclosure such as a portable game machine, a feature phone, a portable information terminal, a PDA, a laptop personal computer, a stationary game machine, and a desktop personal computer. When the game application according to the present disclosure is executed by a plurality of terminal devices 100, the terminal devices 100 do not always need to be the same or the same kind. For example, a certain terminal device 100 may be a smartphone and other terminal devices 100 may be portable game machines.

According to FIG. 3, the terminal device 100 includes a display 111, a processor 112, a sensor 113 including a GPS sensor 114 and a gyro sensor 115, a timer 116, a communication interface 117 including a communication processing circuit 118 and an antenna, a memory 119 including a RAM, a ROM, or a nonvolatile memory (an HDD depending on a case), and an input interface 120 including a touch panel 121 and a hard key 122. These components are electrically connected to one another via a control line and a data line.

The display 111 functions as a display unit that, according to an instruction of the processor 112, reads out image information stored in the memory 119 and performs various kinds of display (for example, FIG. 8B and FIG. 9B) including a virtual space formed by the application according to this embodiment. The display 111 is configured from, for example, a liquid crystal display or an organic EL display.

The input interface 120 is configured from, for example, the touch panel 121 and/or the hard key 122 and receives various instructions and inputs such as an instruction from a player relating to movement of an arrangement position of a player character. The touch panel 121 is disposed to cover the display 111 and outputs information concerning a position coordinate corresponding to image data displayed by the display 111 to the processor 112. As a touch panel type, publicly-known types such as a resistive film type, a capacitive coupling type, and ultrasonic surface acoustic wave type can be used. In this embodiment, the touch panel 121 detects swipe operation and tap operation on items displayed on the display 111 by a pointer. Note that, in this embodiment, the input interface 120 included in the terminal device 100 is used. However, it is also possible to use the input interface 120 connected to a main body including the processor 112 by radio or wire.

The processor 112 is configured from a CPU (a microcomputer) and functions as a control unit that controls, based on various programs stored in the memory 119, other components connected to the processor 112. Specifically, the processor 112 reads out, from the memory 119, a program for executing the application according to this embodiment and a program for executing an OS and executes the programs. In this embodiment, in particular, the processor 112 executes processing for arranging, based on an arrangement position of a player character and an arrangement position of another character stored in the memory 119, both the characters in a virtual game space, processing for updating and storing the arrangement position of the player character in the memory 119 when an instruction to move the arrangement position of the player character is received by the input interface 120, processing for forming a group between the player character and the other character when the player character and the other character are within a predetermined range (for example, the distance between the player character and the other character is smaller than a first threshold) by at least one of the update of the arrangement position of the player character and update of the arrangement position of the other character, and processing for, when the group is formed, imparting predetermined effects to the characters included in the group. Note that the processor 112 may be configured by a single CPU but may be configured by a plurality of CPUs. Processors of other types such as a GPU specialized for image processing may be combined as appropriate.

The memory 119 is configured from a ROM, a RAM, a nonvolatile memory, an HDD, and the like and functions as a storing unit. The ROM stores, as a program, an instruction command for executing an application and an OS according to this embodiment. The RAM is a memory used for performing writing and reading of data while the program stored in the ROM is processed by the processor 112. The nonvolatile memory is a memory in which writing and reading of data are executed by the execution of the program. Data written in the nonvolatile memory is saved even after the execution of the program ends. In this embodiment, in particular, the memory 119 has stored therein programs for processing for arranging, based on an arrangement position of a player character and an arrangement position of another character stored in the memory 119, both the characters in a virtual game space, processing for updating and storing the arrangement position of the player character in the memory 119 when an instruction to move the arrangement position of the player character is received by the input interface 120, processing for forming a group between the player character and the other character when the player character and the other character are within a predetermined range (for example, the distance between the player character and the other character is smaller than a first threshold) by at least one of the update of the arrangement position of the player character and update of the arrangement position of the other character, and processing for, when the group is formed, imparting predetermined effects to the characters included in the group. A character information table (FIG. 5B) is stored in the memory 119 and updated at any time according to processing by the processor 112.

The communication interface 117 functions as a communication unit that transmits and receives, via the communication processing circuit 118 and the antenna, information to and from the server device 200 and other terminal devices set in remote places. The communication processing circuit 118 performs processing for receiving, from the server device 200, a program for executing the game application according to this embodiment, various kinds of information used in the game application, and the like according to the progress of the game application. The communication processing circuit 118 performs processing for transmitting a result of processing by the execution of the game application to the server device 200. In this embodiment, in particular, the communication processing circuit 118 transmits player ID information and the like to the server device 200 and receives character information and the like from the server device 200.

The communication processing circuit 118 processes based on a wideband wireless communication scheme represented by an LTE scheme. However, the communication processing circuit 118 is also capable of performing processing based on a scheme concerning narrowband wireless communication such as a wireless LAN represented by IEEE802.11 or Bluetooth (registered trademark). It is also possible to use wired communication instead of or in addition to the wireless communication.

The sensor 113 includes the GPS sensor 114 and the gyro sensor 115. The GPS sensor 114 detects present position information of the terminal device 100 through communication with a plurality of satellites. The detection of the present location information can be executed at a predetermined interval (for example, every three minutes). The interval can be changed according to whether an application is started in a background or started in a foreground. Note that, in this embodiment, the present location information detected by the sensor 113 may be coordinate information such as latitude and longitude in a real space or may be information for specifying an area (for example, a municipality or a prefecture) formed in the real space. In this embodiment, the GPS sensor 114 and the like are explained as examples of the sensor 113. However, not only this, but, for example, information concerning access points of wifi and a base station of the wideband wireless communication can also be used as the present location information and a communication processing unit or the like capable of acquiring these kinds of information can also be used as the sensor 113.

3. Configuration of Server Device 200

Figures 4, 5A:
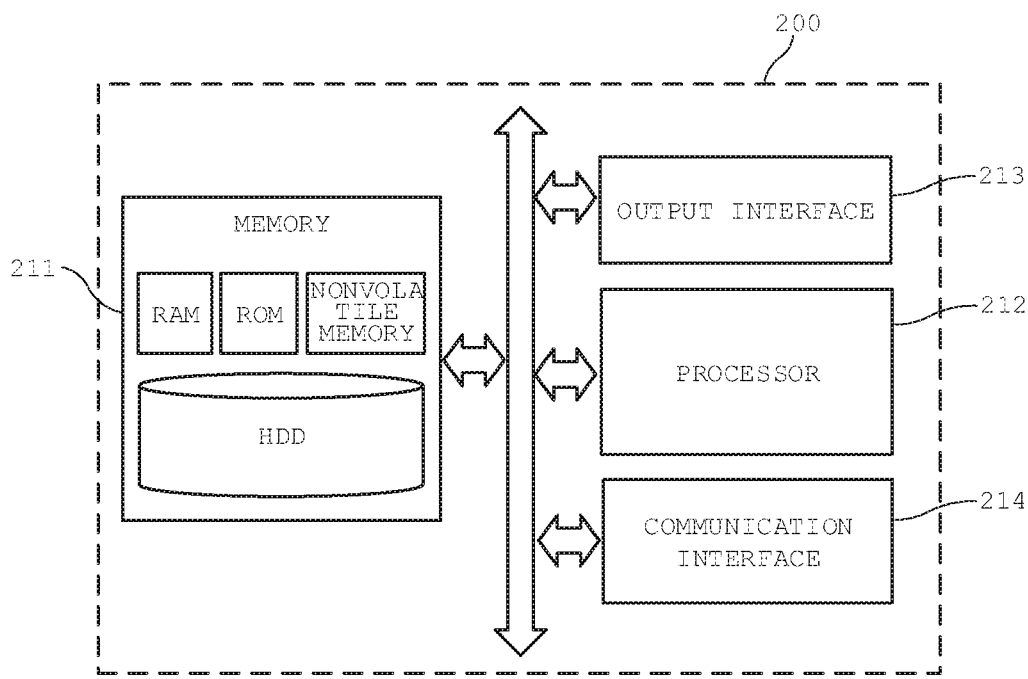
FIG. 4 is a block diagram illustrating an example of a configuration of a server device 200 according to the first embodiment of the present disclosure.
FIG. 5A is a diagram conceptually illustrating a player information table stored in the server device 200 according to the first embodiment of the present disclosure.

FIG. 4 is a block diagram illustrating an example of a configuration of the server device 200 according to the first embodiment of the present disclosure. The server device 200 does not need to include all of components illustrated in FIG. 4. It is also possible to adopt a configuration in which a part of the components is omitted. It is also possible to add other components to the server device 200.

According to FIG. 4, the server device 200 includes a memory 211 including a RAM, a ROM, a nonvolatile memory, and an HDD, a processor 212 configured from a CPU or the like, an output interface 213, and a communication interface 214. These components are electrically connected to one another via a control line and a data line.

The memory 211 includes the RAM, the ROM, the nonvolatile memory, and the HDD and functions as a storing unit. The memory 211 stores, as a program, an instruction command for executing an application and an OS according to this embodiment. Such a program is loaded and executed by the processor 212. The memory 211 stores a player information table illustrated in FIG. 5A, character information arranged in a virtual game space, drawing information, and the like. Further, the memory 211 (in particular, the RAM) is temporarily used in order to execute writing and reading of data while the program is executed by the processor 212. In this embodiment, the memory 211 has stored therein programs for executing processing for receiving position information of player characters of players from the terminal devices 100, processing for transmitting received position information of the player characters to the terminal devices 100, processing for receiving information concerning a formed group from the terminal device 100, processing for receiving information concerning effects imparted to the player character from the terminal device 100, and the like.

Note that, in this embodiment, a case in which the terminal device 100 functions as a processing device is mainly explained. However, the server device 200 can also function as the processing device. That is, when the server device 200 functions as the processing device, the memory 211 has stored therein programs for processing for arranging, based on an arrangement position of a player character and an arrangement position of another character stored in the memory 211, both the characters in a virtual game space, processing for updating and storing arrangement positions of player characters in the memory 211 when an instruction to move the arrangement position of the player character is received by the input interfaces 120 of the terminal devices 100, processing for forming a group between the player character and the other character when the player character and the other character are within a predetermined range (for example, the distance between the player character and the other character is smaller than a first threshold) by at least one of the update of the arrangement position of the player character and update of the arrangement position of the other character, processing for, when the group is formed, imparting predetermined effects to the characters included in the group, and processing for transmitting results obtained by performing the above respective kinds of processing to the terminal devices 100.

The processor 212 is configured from a CPU (a microcomputer) and functions as a control unit for controlling, based on various programs stored in the memory 211, other components connected to the processor 212. In this embodiment, in particular, the processor 212 executes processing for receiving position information of player characters of players from the terminal devices 100, processing for transmitting received position information of the player characters to the terminal devices 100, processing for receiving information concerning a formed group to the terminal device 100, and processing for receiving information concerning effects imparted to the player character from the terminal device 100. The processor 212 may be configured by a single CPU but may be configured by a plurality of CPUs.

Note that, in this embodiment, a case in which the terminal device 100 functions as a processing device is mainly explained. However, the server device 200 can also function as the processing device. That is, when the server device 200 functions as the processing device, the processor 212 executes processing for arranging, based on an arrangement position of a player character and an arrangement position of another character stored in the memory 211, both the characters in a virtual game space, processing for updating and storing arrangement positions of player characters in the memory 211 when an instruction to move the arrangement position of the player character is received by the input interfaces 120 of the terminal devices 100, processing for forming a group between the player character and the other character when the player character and the other character are within a predetermined range (for example, the distance between the player character and the other character is smaller than a first threshold) by at least one of the update of the arrangement position of the player character and update of the arrangement position of the other character, processing for, when the group is formed, imparting predetermined effects to the characters included in the group, and processing for transmitting results obtained by performing the above respective kinds of processing to the terminal devices 100

The communication interface 214 performs, as an example, processing such as modulation and demodulation in order to transmit and receive a program for executing the game application according to this embodiment, various kinds of information, and the like to and from the terminal device 100 via a network 300 or to and from other server devices via the network 300. The communication interface 214 communicates with the terminal devices and other server devices according to the wireless communication scheme described above or a publicly-known wired communication scheme. In this embodiment, in particular, the communication interface 214 receives player information and the like from the terminal device 100 and transmits character information and the like to the terminal device 100.

Although not illustrated in particular, the output interface 213 functions as an information input and output unit for inputting and outputting information between the output interface 213 and various external devices such as a printer and a display. The output interface 213 is capable of adopting, according to a desire, a publicly-known connection scheme such as a serial port, a parallel port, or a USB.

4. Information Stored in Memories

FIG. 5A is a diagram conceptually illustrating a player information table stored in the server device 200 according to the first embodiment of the present disclosure. As an example, the player information table is stored in the memory 211 of the server device 200.

According to FIG. 5A, player name information, player character information, level information, and the like are stored in association with player ID information. The "player ID information" is peculiar information given to players and is information for specifying the players. The "player name information" indicates names used by the players in a game application. The "player character information" is information with which the players specifies characters controllable based on instructions input via the input interface 120 in the game application. The "level information" is information indicating degrees of proficiency in the game application of the players. When the game application is started in the terminal devices 100, the player ID information is transmitted from the terminal device 100. The server device 200 refers to the player information table, authenticates, based on the received player ID information, whether the player is a proper player of the game application, and, when the player is a proper player, transmits game information such as player character information necessary for execution of the game application to the terminal device 100.

FIG. 5B is a diagram conceptually illustrating the character information table stored in the terminal device 100 according to the first embodiment of the present disclosure. As an example, the character information table is stored in the memory 119 of the terminal device 100.

According to FIG. 5B, various kinds of information such as a player character, player characters of other players, enemy characters, and characters and the like controlled by a computer are stored in the character information table. Specifically, attribute information, arrangement coordinate information, hit point information, offensive power information, defensive power information, skill information, group skill information, and the like are each stored in association with character ID information. The "character ID information" is peculiar information given to the characters and is information for specifying the characters. The "attribute information" is information for specifying affinity and rough characteristics of the characters. As an example, relationship among attributes are decided in advance: for example, when an attribute "A1" attacks an attribute "A2", the attribute "A1" gives double damage to the attribute "A2" and, when the attribute "A1" and the attribute "A2" form a group, a hit point is doubled. It is possible to exert various effects in a progress process of a virtual game based on the relationship. The "arrangement coordinate information" is an example of information indicating an arrangement position in this embodiment and is information indicating a coordinate value for determining an arrangement position in a two-dimensional virtual game space. Specifically, (X1, Y1) is stored as an arrangement coordinate in a virtual game space of a player character (for example, character ID information "C1") and (X2, Y2) is stored as an arrangement coordinate in a virtual game space of another character (for example, character ID information "C2"). This arrangement coordinate information is updated and stored at any time according to an instruction from a player input via the input interface, information received from the server device 200 via the communication interface 117, and a result of processing by the processor 112. The "hit point information" is one of ability value parameters from which a predetermined amount is subtracted according to given damage. A hit point of a character decreasing to zero means that, for example, a unit game is processed as "defeat" or use of the character is limited. The "offensive power information" is one of the ability value parameters and is a parameter used to calculate damage given to a character or the like, which is an opponent, during attack by the character. The "defensive power information" is one of the ability value parameters and is a parameter used to calculate damage given by attack on the character from another character. The "skill information" is one of the ability value parameters and is a special technique, different from normal attack and defense, that can be exerted when the character satisfies a predetermined condition in the virtual game. The "group skill" is one of the ability value parameters and is a special skill, different from normal attack, defense, and skill, that can be exerted when a group is formed with another character in the virtual game.

FIG. 5C is a diagram conceptually illustrating a group information table stored in the terminal device 100 according to the first embodiment of the present disclosure. As an example, the group information table is stored in the memory 119 of the terminal device 100. When the distance between characters becomes smaller than the first threshold and both the characters are located within the predetermined range, group ID information is given to the group information table and information including the group ID information given to the table is added to the table. When a group is dissolved, information corresponding to the group is deleted from the group information table.

According to FIG. 5C, various kinds of information such as character ID information, time information, and state information are stored in the group information table in association with the group ID information. The "group ID information" is peculiar information given when the distance between the characters becomes smaller than the first threshold and both the characters are located within the predetermined range and is information for specifying a group that can be formed between the characters. Consequently, it is possible to associate the characters forming the group. The "character ID information" is information for specifying the characters, the distance between which becomes smaller than the first threshold, and to which the group ID information is given. The "time information" is information for specifying time when the distance between the characters becomes smaller than the first threshold. The "state information" is information for specifying whether the distance between the characters becomes smaller than the first threshold and both the characters are located within the predetermined range (a position condition) and the time from when the distance between the characters becomes smaller than the first threshold becomes equal to or larger than a second threshold (a time condition), all group formation conditions are satisfied, and a group is formed. In FIG. 5C, "not completed" indicates a state in which the position condition is satisfied but the time condition is not satisfied and "completed" indicates a state in which both the conditions are satisfied and a group is formed.

Figure 6:
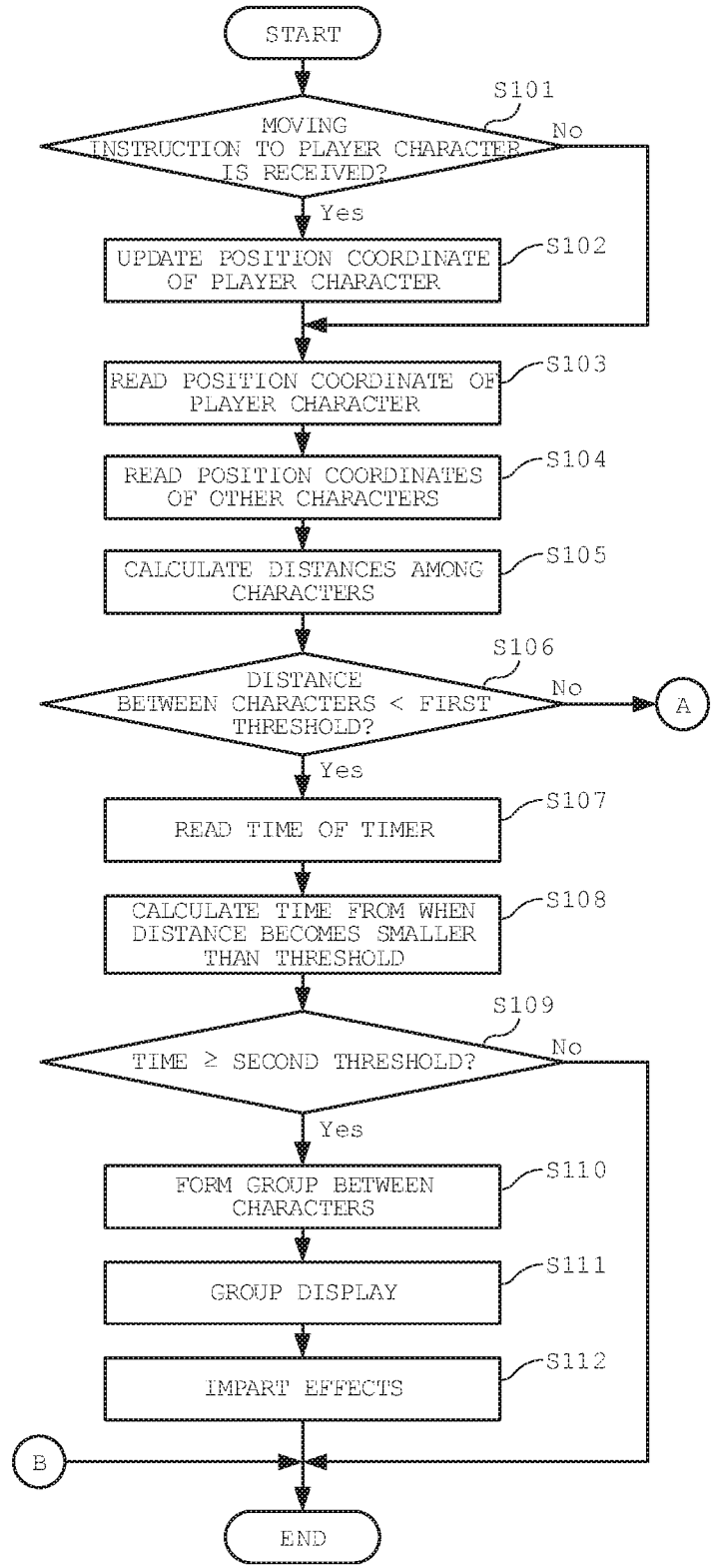
FIG. 6 is a diagram illustrating a processing flow executed in the terminal device 100 according to the first embodiment of the present disclosure.
Figure 7:
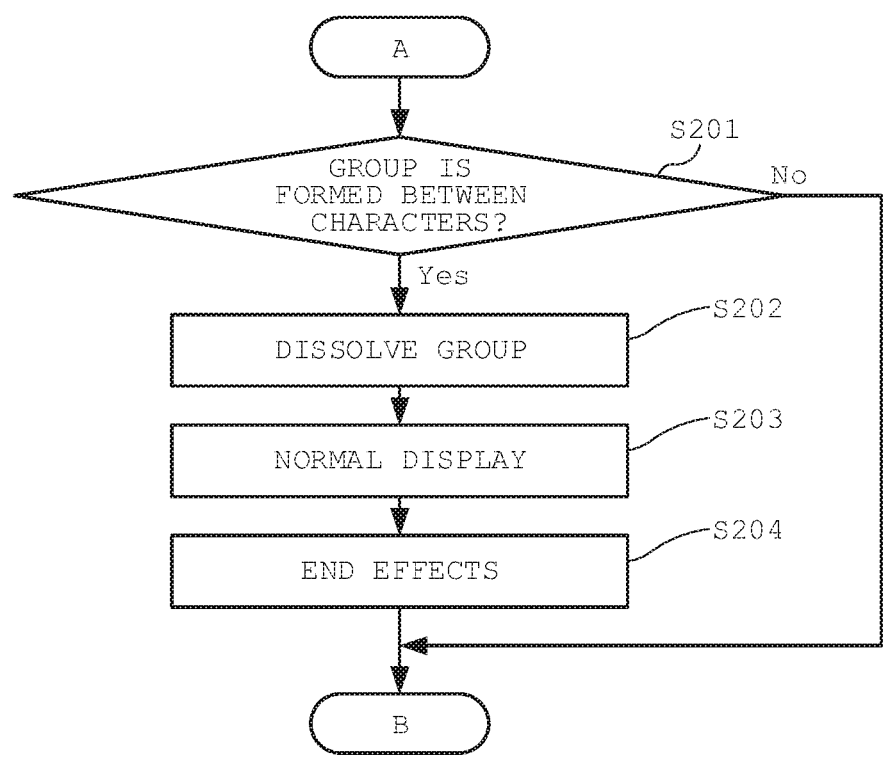
FIG. 7 is a diagram illustrating the processing flow executed in the terminal device 100 according to the first embodiment of the present disclosure.

5. Processing Flow Performed in Terminal Device 100
(1) Case in which Group is not Formed FIG. 6 and FIG. 7 are diagrams illustrating a processing flow executed in the terminal device 100 according to the first embodiment of the present disclosure. Specifically, FIG. 6 and FIG. 7 illustrate a processing flow relating to arrangement of characters and formation of a group carried out after a game application is started by a player and a virtual game is started in a virtual game space. The processing flow is performed by mainly the processor 112 reading out and executing a program stored in the memory 119.

Here, a case in which a player character and another character do not move and a group is not formed between the characters is explained. First, the processor 112 confirms whether an input for instructing the player character to move an arrangement coordinate is received by the input interface 120 (S101). Here, since the input of the instruction is not received and the player character is not moved, the processor 112 does not carry out S102 and the processing flow proceeds to S103. Subsequently, the processor 112 refers to the character information table stored in the memory 119, reads arrangement coordinate information associated with character ID information of the player character, and arranges the player character in the arrangement coordinate of the virtual game space (S103). Similarly, the processor 112 refers to the character information table stored in the memory 119, reads arrangement coordinate information associated with other character ID information, and arranges the characters in arrangement coordinates of the virtual game space (S104). Note that, although update of arrangement coordinates of the other characters is not described here, the arrangement coordinate is updated and stored in the memory 119 at any time by receiving arrangement coordinate information of the other player character from the server device 200 or the like or the processor 112 calculating an arrangement coordinate of the character controlled by the computer according to the progress of the game.

Subsequently, the processor 112 calculates distances among characters arranged in the arrangement coordinates in the virtual game space (S105). The processor 112 determines whether a distance smaller than the first threshold set in advance is present among the calculated distances (S106). Here, as explained above, the case in which a group is not formed is explained. Therefore, the processor 112 ends the processing flow without forming a group or the like between the characters (after S106, proceeds to "No" in S201 in FIG. 7).

(2) Case in which Group is Formed

Next, a case in which an instruction to the player character relating to movement is received by the input interface 120 and a group is formed between the characters is explained. First, the processor 112 confirms whether an input for instructing the player character to move an arrangement coordinate is received by the input interface 120 (S101). Note that the instruction to the player character for movement of an arrangement coordinate is performed by, for example, in the touch panel 121, the player tapping, with a pointer (for example, a fingertip), a position corresponding to a display coordinate of the player character and dragging the pointer toward a moving destination as it is. Besides, the instruction can also be performed by designating a moving direction of the player character with the hard key 122 (for example, a cross key) or operating, through the touch panel 121, a pseudo operation key (for example, a pseudo cross key) displayed on the display 111 to designate a moving direction.

When receiving the movement of the arrangement coordinate of the player character from the player as explained above, the processor updates and stores an arrangement coordinate after the movement in the character information table of the memory 119 (S102). The processor 112 refers to the character information table stored in the memory 119, reads arrangement coordinate information after the update associated with the character ID information of the player character, and arranges the player character in the arrangement coordinate of the virtual game space (S103). Similarly, the processor 112 refers to the character information table stored in the memory 119, reads arrangement coordinate information associated with other character ID information, and arranges the characters in arrangement coordinates of the virtual game space (S104).

Subsequently, the processor 112 calculates distances among characters arranged in the arrangement coordinates in the virtual game space (S105). The processor 112 determines whether a distance smaller than the first threshold set in advance is present among the calculated distances (S106). When a distance between characters is smaller than the first threshold, the processor 112 determines that both the characters are located within the predetermined range and refers to the group information table of the memory 119. When a group formed by the characters, the distance between which is smaller than the first threshold, is not registered, the processor 112 performs control to generate group ID information anew and store, in the group information table, character ID information forming the group ID information, time information specified by the timer 116, and the state information "not completed" meaning that the position condition is satisfied. When the group formed by the characters, the distance between which is smaller than the first threshold, is registered, the processor 112 reads time information associated with group ID information of the group (S107) and calculates a time from when the distance between the characters becomes smaller than the first threshold (S108).

Subsequently, the processor 112 confirms whether the calculated time is equal to or longer than the second threshold (S109). When the calculated time is shorter than the second threshold, the processing flow ends. On the other hand, when the calculated time is equal to or longer than the second threshold, the processor 112 refers to character ID information associated with the group ID information and forms a group between the characters stored in the character ID information (S110). Specifically, in the group information table, the processor 112 updates state information associated with the group ID information from "not completed" to "completed".

Subsequently, the processor 112 performs group display on the display 111 in order to notify the player and the like that the group is formed between the characters (S111). Examples of the group display include performing display surrounding the characters included in the group with one circle object and performing character display "group being formed" on the display 111.

Subsequently, the processor 112 performs control to impart predetermined effects to the characters forming the formed group (S112) and ends a series of processing flow.

Examples of a typical effect include an effect advantageous for the player to advance the virtual game. Examples of such an effect include changing an ability value associated with character ID information of at least one of the characters forming the group, changing an ability value of an enemy character, giving intra-game currency, enabling use of an item that cannot be used before the group formation, and changing an effect obtained during item use. However, these effects are examples. Naturally, the effects may be disadvantageous effects. It is unnecessary to impart the same effect every time during the group formation. For example, the effects can also be differentiated for each of formed groups according to other parameters such as attributes of characters forming the group, levels of the players, and the number of characters forming the group.

Figure 8A:
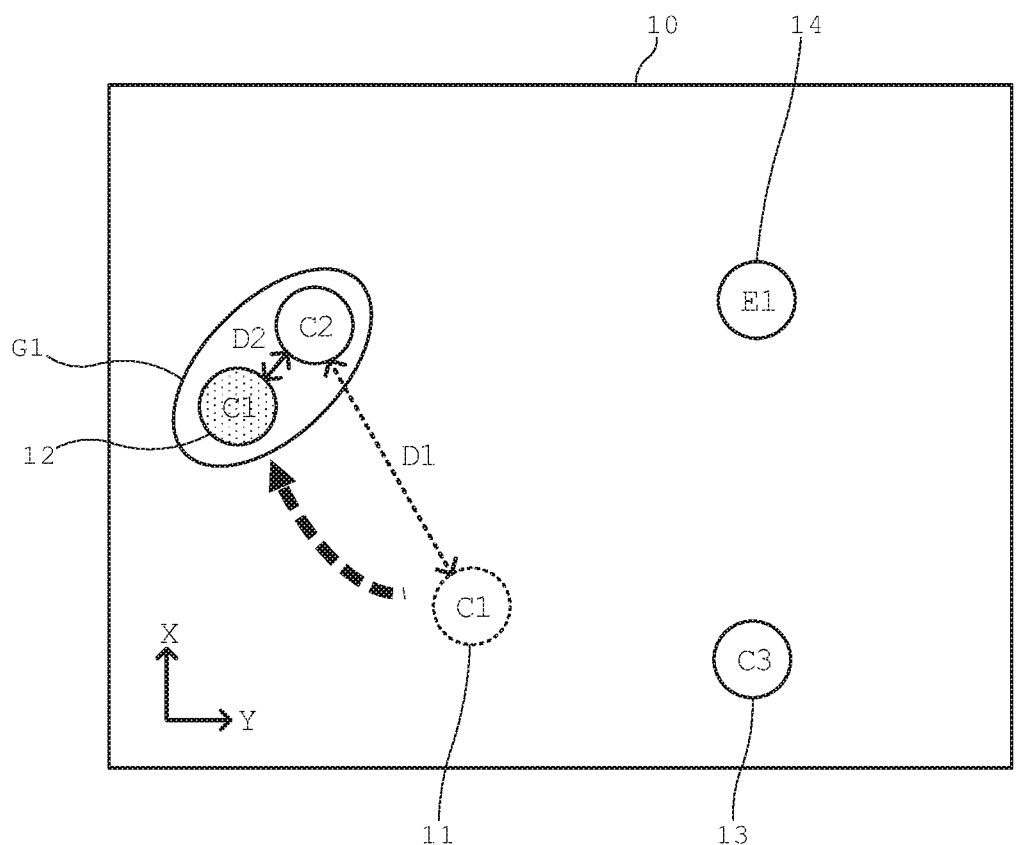
FIG. 8A is a diagram conceptually illustrating a virtual game space of a game application according to the first embodiment of the present disclosure.
Figure 8B:
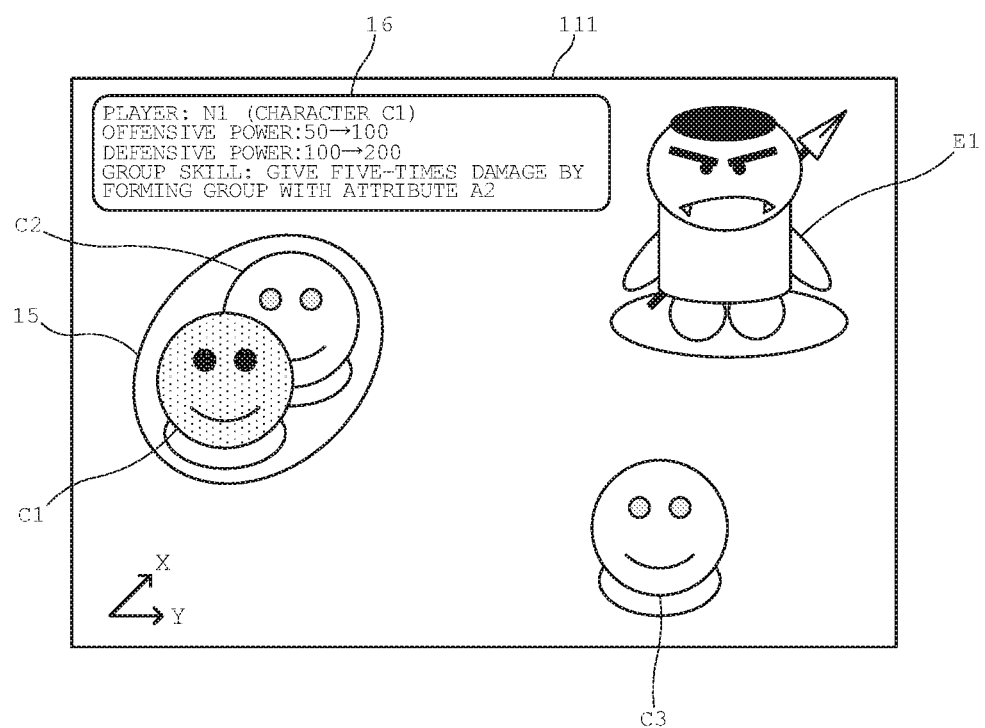
FIG. 8B is a diagram illustrating an example of a screen displayed on the terminal device 100 according to the first embodiment of the present disclosure.

FIG. 8A is a diagram conceptually illustrating the virtual game space of the game application according to the first embodiment of the present disclosure. FIG. 8B is a diagram illustrating an example of a screen displayed on the terminal device 100 according to the first embodiment of the present disclosure. Specifically, FIG. 8A and FIG. 8B illustrate examples of a virtual game space and a screen displayed on the display 111 in the case in which the series of processing flow in S101 to S112 illustrated in FIG. 6 is executed, whereby the group is formed between the characters and the predetermined effects are imparted.

According to FIG. 8A, in the virtual game space 10, the player character C1 is originally arranged in the arrangement position 11 according to the arrangement coordinate information of the character information table. On the other hand, an ally character C2, an ally character C3, and the enemy character E1 are respectively arranged in the arrangement position 12, an arrangement position 13, and an arrangement position 14 according to the arrangement coordinate information of the character information table. That is, the player character C1 and the characters C2 and C3 are arranged in the virtual game space 10 together with the enemy character E1. The virtual game space 10 is formed such that the characters C1 to C3 battle a common enemy, that is, the enemy character E1. At this time, the distance between the player character C1 (the arrangement coordinate (X1, Y1)) and the character C2 (the arrangement coordinate (X2, Y2)) is calculated by solving, for example, the following expression.

$$\text{Distance } D1=\sqrt{(X1-X2)^2+(Y1-Y2)^2}$$

In the example illustrated in FIG. 8A, as a result of calculating the distance between the player character C1 and the character C2, the distance is the distance D1. The distance D1 is larger than the first threshold, that is, both the characters are separated a distance equal to or larger than the first threshold. Both the characters are absent within the predetermined range and a group is not formed.

Subsequently, the player inputs, via the input interface 120, an instruction relating to movement of the player character C1. Therefore, the player character C1 moves from the arrangement position 11 to the arrangement position 12. As a result, the distance between the player character C1 and the character C2 changes to the distance D2. The distance D2 is smaller than the first threshold. Therefore, it is determined that both the characters are present within the predetermined range. Both the characters satisfy the time condition, whereby the group G1 is formed between the player character C1 and the character C2.

Referring to FIG. 8B, a virtual space image obtained by imaging the virtual game space 10 with a virtual camera disposed in a predetermined position of the virtual game space 10 in FIG. 8A is illustrated. The image is displayed on the display 111. According to FIG. 8B, the player character C1, the character C2, and the character C3 are displayed on the virtual space image in addition to the enemy character E1. In the virtual game space 10, since the group is formed between the player character C1 and the character C2, a circle object 15 is displayed to surround both the characters and display for notifying that the group is being formed is performed. Note that the display is not limited to the circle object and may be an object having any shape. Instead of the circle object, a notification by character display such as "group being formed", a notification by voice, a notification by lighting of an LED or the like, or the like may be performed. Notifications obtained by combining these notifications may be performed. These notifications may not be performed in particular.

According to FIG. 8B, in order to indicate that the predetermined effect is imparted to the player character C1 because the group is formed, an ability value tray 16 is superimposed and displayed on the virtual space image. The example illustrated in FIG. 8B indicates that, among ability values of the player character C1 of a player N1, offensive power is changed from "50" to "100", defensive power is changed from "100" to "200", and a skill for "giving five-times damage to the enemy character E1 by forming a group with an attribute A2" can be triggered as the group skill.

(3) Case in which Group is Dissolved

Next, referring back to FIG. 6, a case in which an instruction to the player character relating to movement is further received by the input interface 120 and the group formed between the characters is dissolved is explained. First, the processor 112 confirms whether an input for instructing the player character to move an arrangement coordinate is received by the input interface 120 (S101). When receiving movement of the arrangement coordinate of the player character from the player, the processor updates and stores an arrangement coordinate after the movement in the character information table of the memory 119 (S102). The processor 112 refers to the character information table stored in the memory 119, reads arrangement coordinate information after the update associated with the character ID information of the player character, and arranges the player character in the arrangement coordinate of the virtual game space (S103). Similarly, the processor 112 refers to the character information table stored in the memory 119, reads arrangement coordinate information associated with other character ID information, and arranges the characters in arrangement coordinates of the virtual game space (S104).

Subsequently, the processor 112 calculates distances among characters arranged in the arrangement coordinates in the virtual game space (S105). The processor 112 determines whether a distance smaller than the first threshold set in advance is present among the calculated distances (S106). Here, a case in which further movement of the player character is instructed in S101 and the distance between the player character and the other character increases, that is, the distance between the characters becomes equal to or larger than the first threshold is explained. When the distance between the characters becomes equal to or larger than the first threshold in S106, the processing flow shifts to the processing flow in FIG. 7.

According to FIG. 7, first, the processor 112 confirms, referring to the group information table, whether a group is already formed between the characters (S201). At this time, when both the characters, the distance between which is calculated, is stored in the character ID information of the group information table, this indicates that a group is already formed between the characters. Subsequently, although the distance between both the characters is smaller than the first threshold and the group is formed, since both the characters are separated more than the first threshold again, the processor 112 performs processing to dissolve the group (S202). Specifically, the processor 112 specifies, from the group information table of the memory 119, group ID information to which the characters belong and erases a pertinent group from the group information table.

Subsequently, in order to notify the player and the like that the group is dissolved, the processor 112 erases the group display on the display 111 and returns the display 111 to a normal display form (S203). Note that, at this time, besides changing the display form, it is also possible to perform display such as "group dissolved".

Subsequently, the processor 112 performs processing for ending, because the group is dissolved, the effect imparted because the group is formed (S204). As an example, when processing for improving ability values of the characters is performed as the effect, the processor 112 performs processing for retuning the improved ability values to normal ability values. Note that, when, for example, intra-game currency is imparted as the effect by the group formation, it is also possible to omit end processing for the effect. Thereafter, referring back to FIG. 6, the processor 112 ends the series of processing.

Figure 9A:
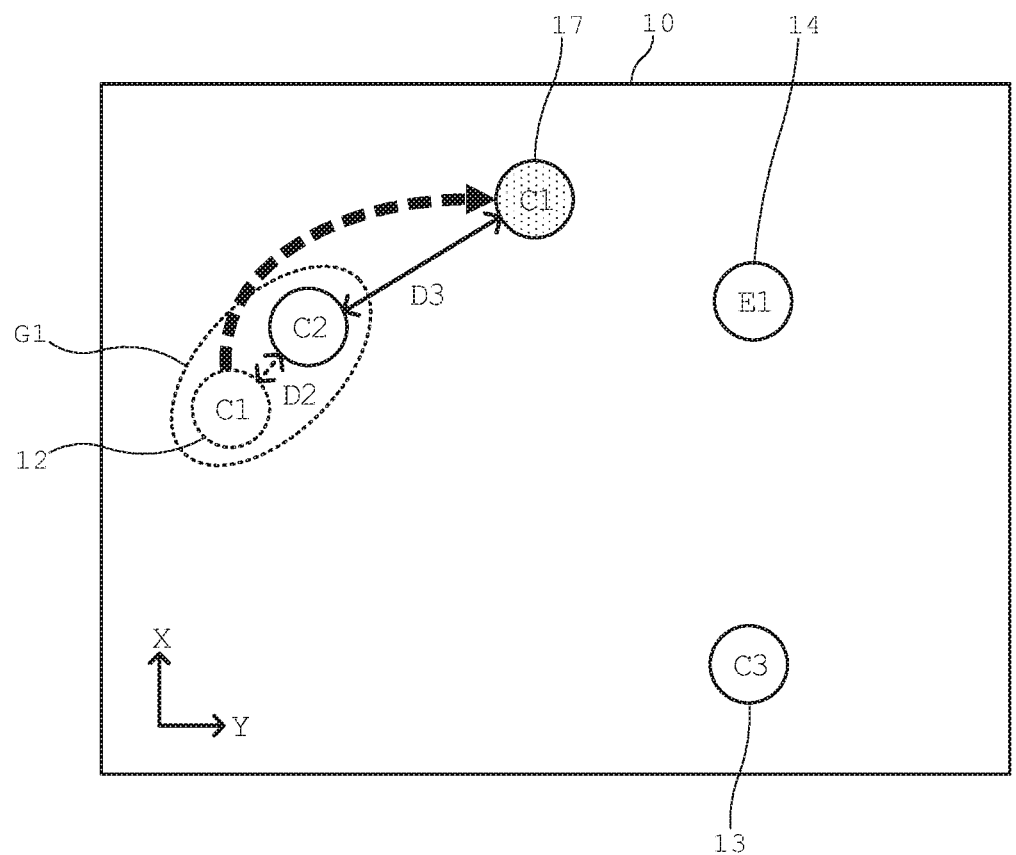
FIG. 9A is a diagram conceptually illustrating the virtual game space of the game application according to the first embodiment of the present disclosure.
Figure 9B:
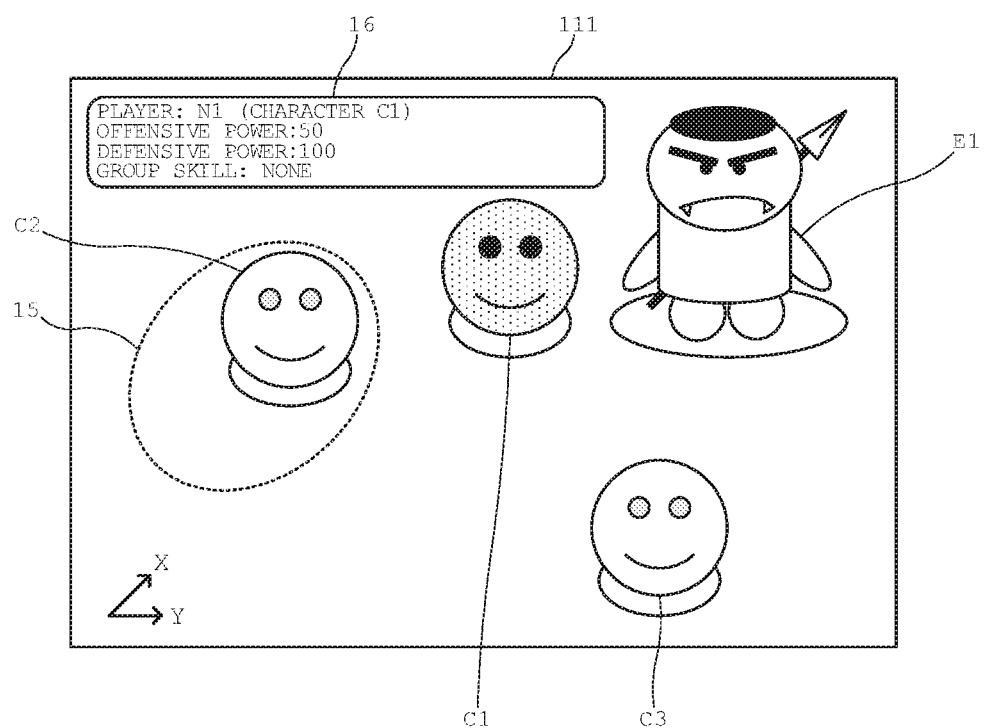
FIG. 9B is a diagram illustrating an example of a screen displayed on the terminal device 100 according to the first embodiment of the present disclosure.

FIG. 9A is a diagram conceptually illustrating the virtual game space of the game application according to the first embodiment of the present disclosure. FIG. 9B is a diagram illustrating an example of a screen displayed on the terminal device 100 according to the first embodiment of the present disclosure. Specifically, FIG. 9A and FIG. 9B illustrate examples of a virtual game space and a screen displayed on the display 111 in the case in which the group formed between the characters is dissolved according to execution of the series of processing flow in S101 to S106 and S201 to S204 illustrated in FIG. 6 and FIG. 7.

According to FIG. 9A, in the virtual game space 10, the player character C1, the character C2, the character C3, and the enemy character E1 are arranged in respective arrangement positions according to the arrangement coordinate information of the character information table. At this time, the player character C1 and the character C2 are arranged to be separated the distance D2 smaller than the first threshold. Both the characters form the group G1.

Subsequently, when the player inputs, via the input interface 120, an instruction for moving the player character C1 from the arrangement position 12 to an arrangement position 17, the player character C1 is moved from the arrangement position 12 to the arrangement position 17. The player character C1 and the character C2 spread to a distance D3 equal to or larger than the first threshold. As a result, the formed group G1 is dissolved. The player character C1 and the character C2 each independently battle the common enemy E1.

Referring to FIG. 9B, a virtual space image obtained by imaging the virtual game space 10 with a virtual camera disposed in a predetermined position of the virtual game space 10 in FIG. 9A is illustrated. The image is displayed on the display 111. According to FIG. 9B, the player character C1, the character C2, and the character C3 are displayed on the virtual space image in addition to the enemy character E1. At this time, since the group formed by the player character C1 and the character C2 is dissolved, the display of the circle object 15 indicating that the group is being formed is erased. Normal ability values, which are normal display forms, are each displayed on the ability value tray 16 of the player character C1.

As explained above, in this embodiment, the group is formed between the characters close to each other less than the first threshold. Specifically, the group is formed between the characters by only moving the player character according to the instruction of the player to obtain the predetermined effect. The formed group can be dissolved by only moving the player character to be at the distance equal to or larger than the first threshold according to the instruction of the player. In this way, in this embodiment, it is possible to control the formation and the dissolution of the group only by moving the character without requiring a special troublesome instruction input or the like. In this embodiment, in addition to the position condition explained above, the time condition is also considered. Consequently, it is possible to prevent unintended group formation, for example, when the characters are temporarily close to each other less than the first threshold without being intended in the process of the movement.

Second Embodiment

In in the case explained in the first embodiment, the group is formed between the characters based on the two conditions, that is, the position condition and the time condition. In a second embodiment, a case in which a group is formed further based on an enemy character E1 in addition to the above is explained. Note that this embodiment is the same as the configurations, the processing, and the procedures in the first embodiment except points specifically explained below. Therefore, detailed explanation of those matters is omitted.

Figure 10:
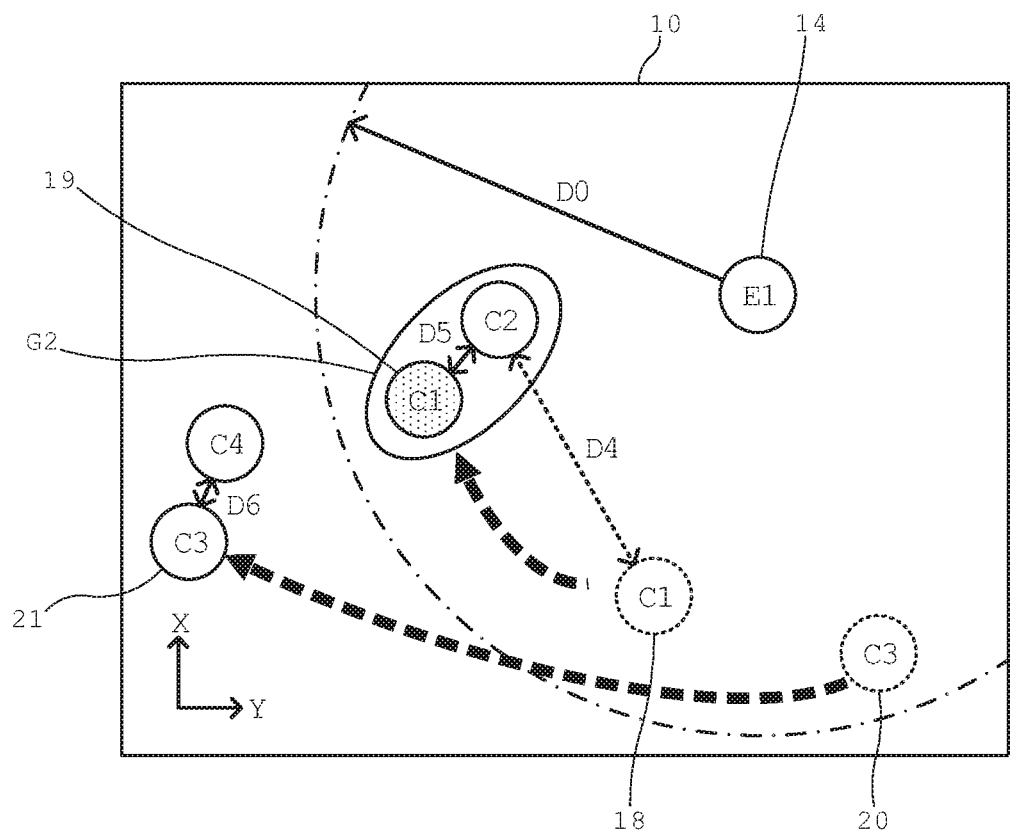
FIG. 10 is a diagram conceptually illustrating a virtual game space of a game application according to a second embodiment of the present disclosure.

FIG. 10 is a diagram conceptually illustrating a virtual game space of a game application according to the second embodiment. According to FIG. 10, in a virtual game space 10, a player character C1 and a player character C3 are arranged in an arrangement position 18 and an arrangement position 20, which are original arrangement positions, according to arrangement coordinate information of a character information table. On the other hand, a character C2, a character C4, and an enemy character E1 are arranged in arrangement positions according to the arrangement coordinate information of the character information table. Thereafter, an input of an instruction to the player character C1 relating to movement from a player is received by an input interface 120, whereby an arrangement position of the player character C1 moves to the arrangement position 19. As a result, the distance between the player character C1 and the character C2 changes from D4 equal to or larger than a first threshold to D5 smaller than the first threshold. Further, the distance from the enemy character E1 to an arrangement position of the player character C1 after the movement becomes smaller than a third threshold (a distance D0). At this time, the player character C1 and the character C2 form a group G2 by further satisfying a time condition.

On the other hand, an input of an instruction to the player character C3 relating to movement from the player is received by the input interface 120 and the player character C3 moves from the arrangement position 20 to an arrangement position 21. As a result, the distance between the player character C3 and the character C4 changes to D6 smaller than the first threshold. However, at this time, the player character C3 after the movement is separated the third threshold (the distance D0) or more from the enemy character E1. Therefore, irrespective of whether the time condition is satisfied, a group by the player character C3 and the character C4 is not formed.

Figure 11:
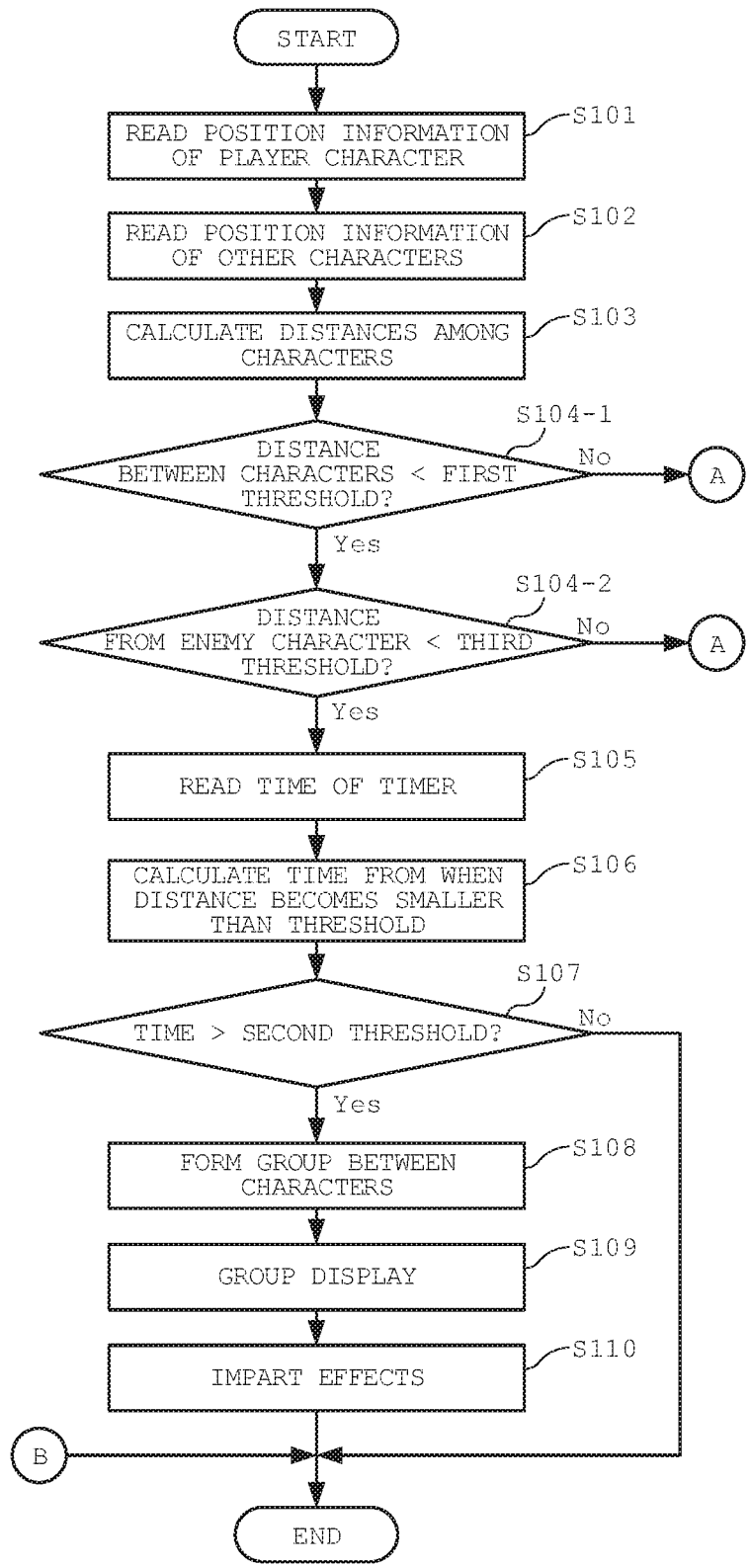
FIG. 11 is a diagram illustrating a processing flow executed in a terminal device 100 according to the second embodiment of the present disclosure.

FIG. 11 is a diagram illustrating a processing flow executed in a terminal device 100 according to the second embodiment of the present disclosure. When compared with the processing flow in the first embodiment, the processing flow is the same except that processing in S104-2 is added. Therefore, explanation of the points already explained in the first embodiment is omitted.

In the second embodiment, as explained above, in the formation of the group, in addition to the position condition and the time condition, it is further determined whether the distance from the enemy character is smaller than the third threshold. That is, a processor 112 calculates a distance between a player character and another character (S103) and, when the distance is smaller than the first threshold (S104-1), calculates a distance between the player character and the enemy character. The processor 112 determines whether the distance between the player character and the enemy character is smaller than the third threshold (S104-2). When the distance is smaller than the third threshold, the processor 112 determines whether the time condition is satisfied (S105 and S106) and, when the time condition is satisfied, forms a group (S107). On the other hand, when the distance between the player character and the enemy character is equal to or larger than the third threshold, the processor 112 shifts to processing in S201 and subsequent steps illustrated in FIG. 7 and does not form a group or dissolves the formed group.

As explained above, in this embodiment, the distance between the player character and the enemy character is further considered. That is, for example, when the player character is separated from the enemy character and is not in a positional relation in which the player character can attack the enemy character, even if the player character forms a group with another character, the processing is sometimes useless. However, in the second embodiment, in addition to the effects described in the first embodiment, since the distance from the enemy character is also considered, it is possible to prevent such an inconvenience.

Third Embodiment

In the case explained in the first and second embodiments, as the position condition, it is considered whether the player character and the other character in the virtual game space 10 are present within the predetermined range, that is, the distance between both the characters is considered. In a third embodiment, control is performed based on a present location in a real space of a player rather than the positions of characters in a virtual game space 10. That is, a game application according to the third embodiment is typically executed by a terminal device 100 such as a smartphone or a portable game machine that the player can hold while moving. Examples of such a game application include a game application called position game in which a real space position of a real space in which a player is present and a virtual space position of a virtual game space are associated and a position of the player in the real space and a position of a player character in the virtual game space are associated. Note that this embodiment is the same as the configurations, the processing, and the procedures in the first and second embodiments except points specifically explained below. Therefore, detailed explanation of those matters is omitted.

Figure 12:
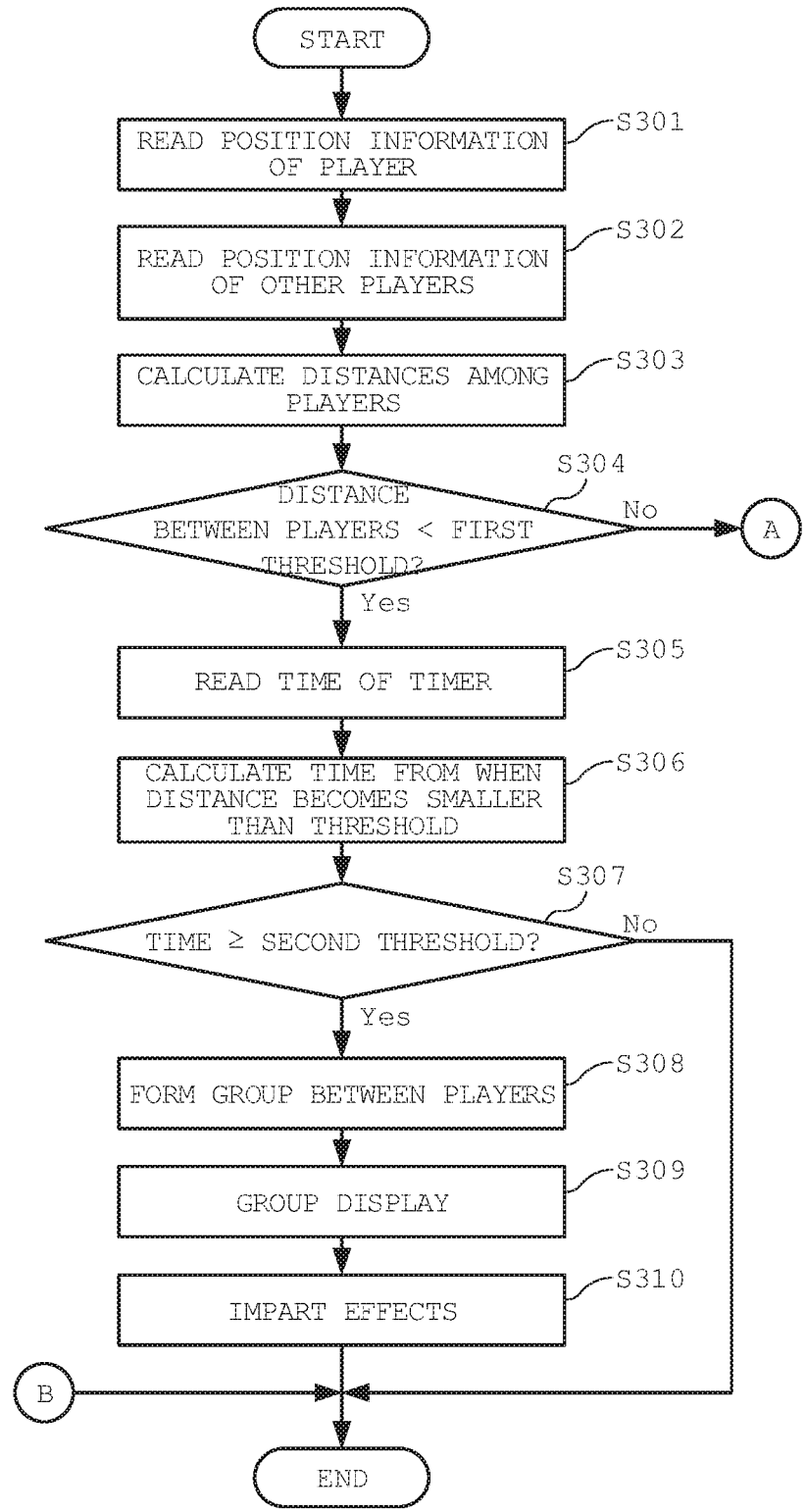
FIG. 12 is a diagram illustrating a processing flow executed in a terminal device 100 according to a third embodiment of the present disclosure.
Figure 13:
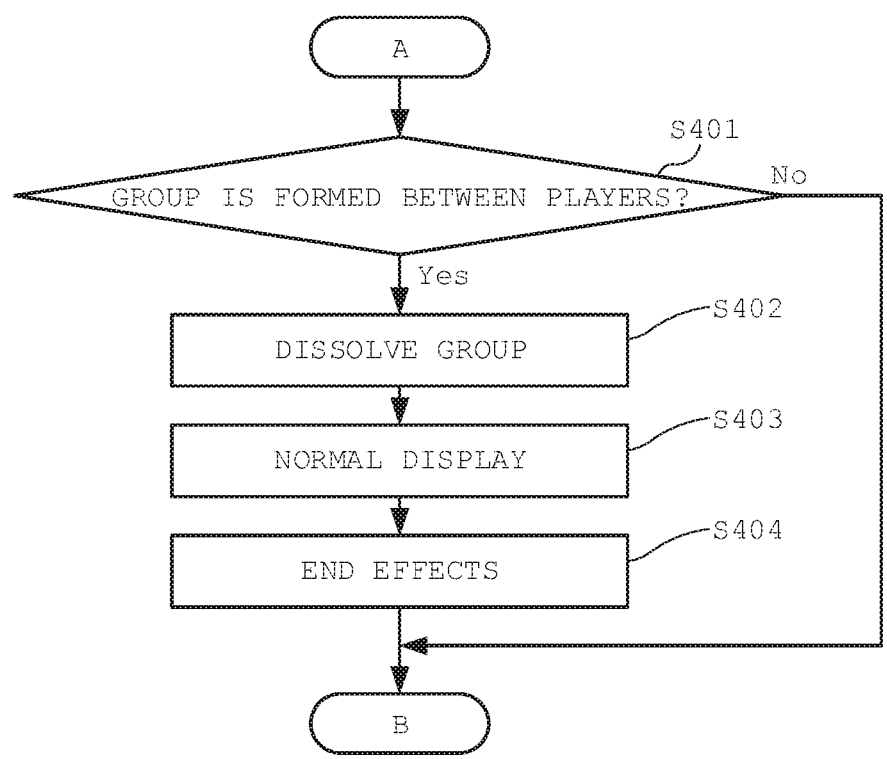
FIG. 13 is a diagram illustrating the processing flow executed in the terminal device 100 according to the third embodiment of the present disclosure.

FIG. 12 and FIG. 13 are diagrams illustrating a processing flow executed in the terminal device 100 according to the third embodiment of the present disclosure. Specifically, FIG. 12 and FIG. 13 are executed by, after the game application is started by the player, detecting a present location of the terminal device 100 held by the player with a sensor 113 included in the terminal device 100. The processing flow is performed by mainly the processor 112 reading out and executing a program stored in the memory 119.

First, the processor 112 receives an output from the sensor 113 and reads present position information of the terminal device 100 held by the player himself or herself (S301). At this time, although not illustrated again, the read information is stored in the memory 119 as position information of the player. The processor 112 controls a communication interface 117 to receive, from terminal devices held by other players connected through a network 300, present position information detected by sensors of these terminal devices and reads the received position information as position information of the other players (S302). At this time, although not illustrated, the read position information is stored in the memory 119 as the position information of the other players. Note that the position information of the other players may be directly received from the other terminal devices or may be received through a server device 200 or other devices as appropriate.

Subsequently, the processor 112 calculates distances among the players from the read position information of the player himself or herself and the read position information of the other players (S303). The processor 112 determines whether a distance smaller than a preset first threshold is present among the calculated distances (S304). When the distance between players is smaller than a first threshold, the processor 112 determines that both the players are located within a predetermined range and refers to a group information table of the memory 119. When a group formed by player characters of the players, the distance between whom is smaller than the first threshold, is not registered, the processor 112 performs control to generate group ID information anew and store, in the group information table, player character ID information forming the group ID information, time information specified by a timer 116, and state information of "not completed" meaning that a position condition is satisfied. When a group formed by player characters, the distance between whom is smaller than the first threshold, is registered, the processor 112 reads time information associated with group ID information of the group (S305) and calculates a time from when the distance between the players becomes smaller than the first threshold (S306).

Subsequently, the processor 112 confirms whether the calculated time is equal or larger than a second threshold (S307). When the calculated time is shorter than the second threshold, the processing flow ends. On the other hand, when the calculated time is equal to or larger than the second threshold, the processor 112 refers to player character ID information associated with the group ID information and forms a group between player characters stored in character ID information (S308). Specifically, in the group information table, the processor 112 updates state information associated with the group ID information from "not completed" to "completed".

Subsequently, the processor 112 performs group display on a display 111 in order to notify the player and the like that the group is formed between the player characters (S309). The processor 112 performs control to impart predetermined effects to the characters forming the formed group (S310) and ends a series of processing flow.

On the other hand, when determining in S304 that the distance between the players is equal to or larger than the first threshold, the processor 112 shifts to processing illustrated in FIG. 13. First, the processor 112 determines whether a group is already formed between both the players (S401) and, when a group is formed, carries out processing for dissolving the group (S402 to S404) and ends a series of processing. When a group is not formed between both the players, the processor 112 directly ends the series of processing. Details of these kinds of processing are the same as the details of the processing in the first and second embodiments.

Note that, in FIG. 12 and FIG. 13, position information in the real space of the player and position information in the real space of the other player are used. However, it is also possible to use position information in a virtual space of a virtual character instead of the position information in the real space of the other player. That is, it is also possible to calculate a distance in the real space between the player and the virtual character from the position information in the real space of the player and position information in the real space corresponding to the position information in the virtual space of the virtual character and perform the same processing.

As explained above, in this embodiment, a group is formed according to whether the distance in the real space is smaller than the first threshold. Specifically, the player only moves in the real space, whereby a group is formed between the player character and the other character and the predetermined effects are obtained. The player only moves in the real space, whereby the formed group can be dissolved. In this way, in this embodiment, it is possible to control the formation and the dissolution of the group only with the movement of the player without requiring a special troublesome instruction input or the like. In this embodiment, in addition to the position condition explained above, the time condition is also considered. Consequently, it is possible to prevent unintended group formation, for example, when the characters are temporarily close to each other less than the first threshold without being intended in the process of the movement. Further, by considering the distance from the distance information in the real space corresponding to the position information in the virtual space of the enemy character as in the second embodiment, it is possible to obtain the same effects as the effects in the second embodiment.

Fourth Embodiment

In the case explained in the first to third embodiments, the group is formed between the characters based on the two conditions, that is, the position condition and the time condition using the position information of the characters or the players. In a fourth embodiment, a case in which, in addition to the above, a new character is added to an existing group based on position information of existing group and characters is explained. Note that this embodiment is the same as the configurations, the processing, and the procedures in the first embodiment except points specifically explained below. Therefore, detailed explanation of those matters is omitted.

Figures 14, 15:
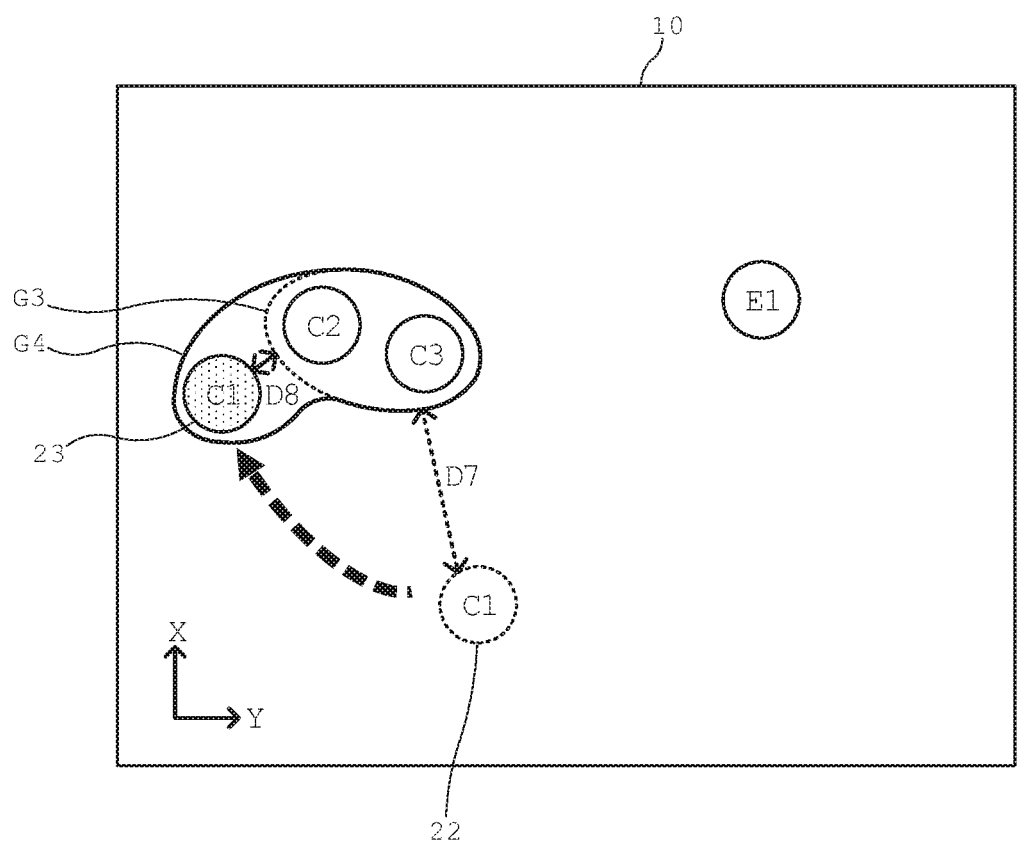
FIG. 14 is a diagram conceptually illustrating a virtual game space of a game application according to a fourth embodiment of the present disclosure.
FIG. 15 is a diagram conceptually illustrating a character range information table stored in a terminal device 100 according to a sixth embodiment of the present disclosure.

FIG. 14 is a diagram conceptually illustrating a virtual game space of a game application according to the fourth embodiment of the present disclosure. According to FIG. 14, in a virtual game space 10, a group G3 formed by an enemy character E1, a character C2, and a character C3 is arranged as an existing group based on position information stored in a memory 119. In the virtual game space 10, a player character C1 is arranged in an arrangement position 22 based on the position information stored in the memory 119. When an instruction to the player character C1 relating to movement is input by a player via the input interface 120, according to the instruction, position information associated with character ID information of the player character is updated to position information corresponding to an arrangement position 23 at a moving destination. In response to the update of the position information, the player character C1 in the virtual game space 10 also moves to the arrangement position 23. As a result, the distance from the player character C1 to the group G3 is reduced from D7 equal to or larger than a first threshold to D8 smaller than the first threshold. Thereafter, by satisfying a time condition, it is possible to form a new group G4 between the group G3 and the player character C1.

Note that, as an example, such processing can be performed as explained below. First, position coordinate information of groups is stored in a group information table of the memory 119 in association with group ID information. When reading position coordinate information of other characters, calculating distances among characters, and confirming whether the distances are equal to or larger than the first threshold in S104 to S106 in FIG. 6, a processor 112 also reads the position coordinate information of the group, also calculates a distance between a player character and the group, and confirms whether the distance is equal to or larger than the first threshold. Consequently, it is possible to execute processing according to the fourth embodiment. As another example of such processing, when reading position information of other players, calculating distances among the players, and confirming whether the distances are equal to or larger than the first threshold in S302 to S304 in FIG. 12, the processor reads position information in a real space corresponding to a position coordinate of the group, calculates position information of the player and a distance based on the position information, and confirms whether the distance is equal to or larger than the first threshold. Consequently, it is possible to execute the processing according to the fourth embodiment.

As explained above, in this embodiment, the distance between the character or the player and the group is further considered. That is, in addition to the effects described in the first to third embodiments, since the distance between the character or the player and the group is further considered, it is possible to perform more various group formation.

Fifth Embodiment

In the first to fourth embodiments, the group is formed if the position condition and the time condition are satisfied between the character and the player, or the group. However, in addition to these conditions, different parameters such as character information of characters and player information of players may be further considered. Examples of the character information of the characters include attribute information, role information, and ability value information. The attribute information is classifications determined in advance for the characters. Examples of the attribute information include "tree", "fire", "water", "light", and "darkness". Affinities are determined in advance among attributes: for example, "tree" is strong against the "water" attribute and weak against the "fire" attribute. The role information is information deciding roles of the characters in progress of a virtual game. Examples of the role information include "leader", "merchant", "witch", "warrior", and "brave man". Ability values corresponding to the roles are preset for the characters. The ability value information is as explained above. That is, the processor refers to, in addition to the position condition and the time condition, the character information such as the attribute information, the role information, and the ability value information, determines predetermined conditions (for example, whether character information between the characters matches and whether a total value of ability values of the characters is larger than a predetermined value), and determines whether to form a group.

Examples of the player information of the players include level information, taste information, and history information of the players. The level information is information representing proficiency in a virtual game being executed of each of the players and is information determined according to the number of cleared dungeons, stages, and the like included in the virtual game and a degree of progress. The taste information is information specified based on acts of the players in the real space and is information specified based on, for example, a browsing history of web sites. The history information is information concerning a history at the time when a user executes the virtual game and is information such as the number and content of cleared dungeons and stages, characters used so far, and types of characters and players formed in the past. That is, the processor refers to, in addition to the position condition and the time condition, the player information such as the level information, the taste information, and the history information, determines predetermined conditions (for example, whether a level difference is within a predetermined range, whether a taste matches, and whether a group is formed in the past), and determines whether to form a group this time.

As explained above, in this embodiment, in addition to the position condition and the time condition, different parameters such as the character information of the characters and the player information of the players are further considered. That is, in addition to the effects described in the first to fourth embodiments, these parameters are further considered. Therefore, it is possible to perform more various group formation.

Sixth Embodiment

In the case explained in the first to fifth embodiments, as the position condition, the distance between both the characters, the distance between both the player characters, or the distance between the character and the group is calculated and it is determined whether the characters, the player characters, or the character and the group are located within the predetermined range. In a sixth embodiment, a range centering on a predetermined position coordinate is set in advance for each of characters or players. A group is formed according to whether other characters or players are located in the range. Note that this embodiment is the same as the configurations, the processing, and the procedures in the first and second embodiments except points specifically explained below. Therefore, detailed explanation of those matters is omitted.

FIG. 15 is a diagram conceptually illustrating a character range information table stored in a terminal device 100 according to the sixth embodiment of the present disclosure. According to FIG. 15, "size information", "center coordinate information", and "intra-group character information" are stored in association with "character ID information" for specifying characters present in a virtual game space 10. The "size information" is information indicating a size of a range used for determination concerning whether a group is formed. Another character is present within the range, whereby a group is formed with the character. The "center coordinate information" is a coordinate in the center of a range used to determine whether to form a group. Note that, in this embodiment, a range of a circle centering on a coordinate specified by the center coordinate information and having a size specified by the size information is set. Therefore, the "size information" and the "center coordinate information" are set. However, a shape of the range may be any shape and the "size information" and the "center coordinate information" may be any information that can specify the range instead of the size information in the range and the center coordinate information in the range. The "intra-group character information" is character ID information of the characters forming the group.

Figure 16:
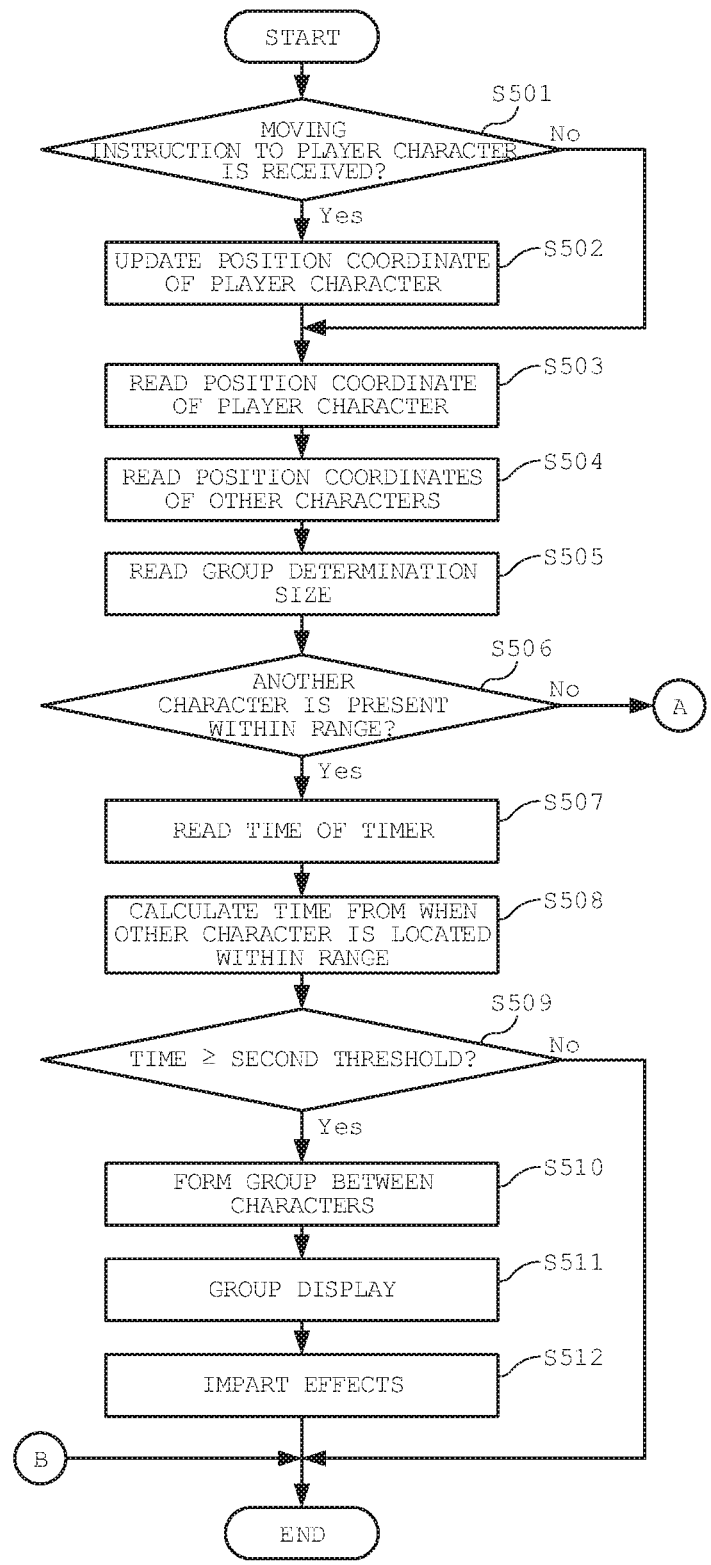
FIG. 16 is a diagram illustrating a processing flow executed in the terminal device 100 according to the sixth embodiment of the present disclosure.

FIG. 16 is a diagram illustrating a processing flow executed in the terminal device 100 according to the sixth embodiment of the present disclosure. Specifically, FIG. 16 illustrates a processing flow relating to arrangement of characters and formation of a group carried out after a game application is started by a player and a virtual game is started in a virtual game space. The processing flow is performed by mainly the processor 112 reading out and executing a program stored in the memory 119.

First, the processor 112 confirms whether an input for instructing a player character to move an arrangement coordinate is received by an input interface 120 (S501). When receiving movement of an arrangement coordinate of the player character from a player, the processor updates and stores an arrangement coordinate after the movement in a character information table of the memory 119 (S502). The processor 112 refers to the character information table stored in the memory 119, reads arrangement coordinate information after the update associated with character ID information of the player character, and arranges the player character in the arrangement coordinate in the virtual game space (S503). Similarly, the processor 112 refers to the character information table stored in the memory 119, reads arrangement coordinate information associated with other character ID information, and arranges characters in arrangement coordinates in the virtual game space (S504).

Subsequently, the processor 112 refers to the character range information table and reads the size information and the center coordinate information as range information for group determination stored for each of the characters (S505). The processor 112 determines, for each of the characters, whether another character located within the range is present (S506). Subsequently, the processor 112 reads time information associated with group ID information of the character (S507) and calculates a time from when the other character is located within the range in S506 (S508).

Subsequently, the processor 112 confirms whether the calculated time is equal to or larger than a second threshold (S509). When the calculated time is shorter than the second threshold, the processing flow ends. On the other hand, when the calculated time is equal to or larger than the second threshold, the processor 112 stores, as intra-group character ID information, character ID information for specifying the other character, a group of which is formed in association with character ID information of the character itself, and forms a group with the character having the stored character ID information (S510).

Subsequently, the processor 112 performs group display on the display 111 in order to notify the player and the like that the group is formed between the characters (S511). Examples of the group display include performing display surrounding the characters included in the group with one circle object and performing character display "group being formed" on the display 111.

Subsequently, the processor 112 performs control to impart predetermined effects to the characters forming the formed group (S512) and ends a series of processing flow. Examples of a typical effect include an effect advantageous for the player to advance the virtual game. Examples of such an effect include changing an ability value associated with character ID information of at least one of the characters forming the group, changing an ability value of an enemy character, giving intra-game currency, enabling use of an item that cannot be used before the group formation, and changing an effect obtained during item use. However, these effects are examples. Naturally, the effects may be disadvantageous effects. It is unnecessary to impart the same effect every time during the group formation. For example, the effects can also be differentiated for each of formed groups according to other parameters such as attributes of characters forming the group, levels of the players, and the number of characters forming the group.

Note that, although not illustrated in particular, processing during group dissolution is the same as the processing in the other embodiments.

Figure 17A:
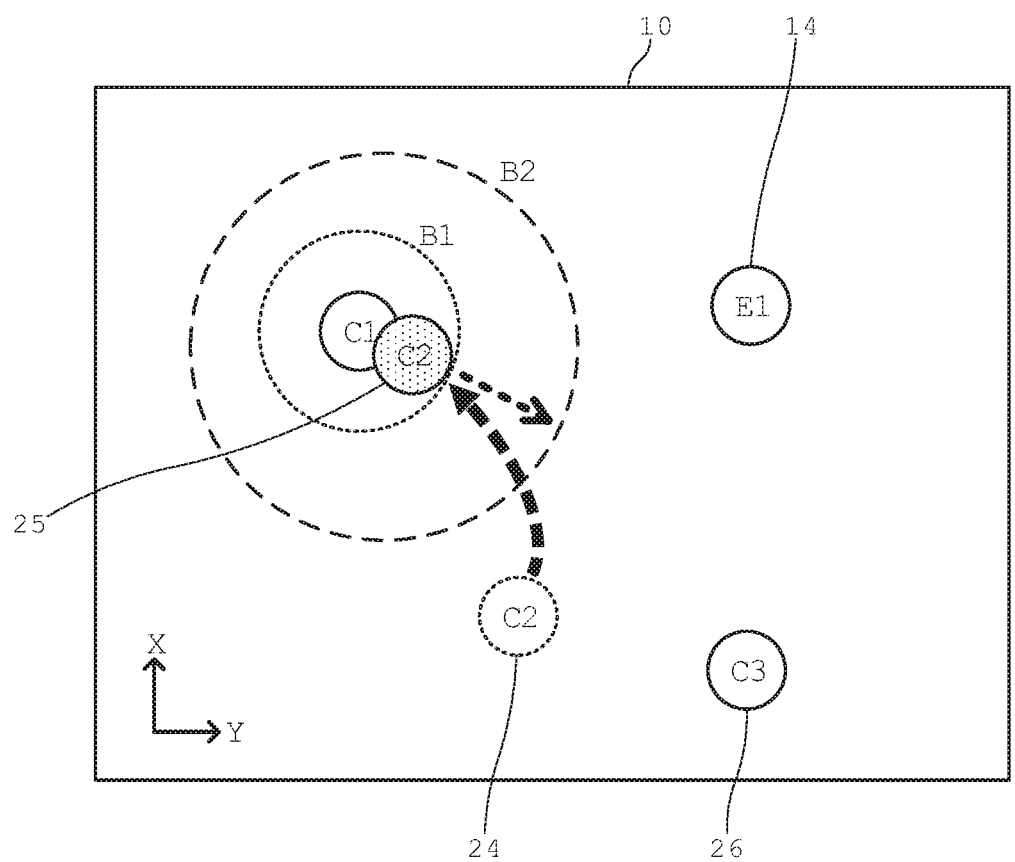
FIG. 17A is a diagram conceptually illustrating a virtual game space of a game application according to the sixth embodiment of the present disclosure.

FIG. 17A is a diagram conceptually illustrating a virtual game space of a game application according to the sixth embodiment of the present disclosure. Specifically, FIG. 17A illustrates a virtual game space 10 in the case in which, after it is determined in S506 that another character is absent within the predetermined range, S503 to S506 are performed again by the next cycle, as a result, it is determined that another character is present within the predetermined range. According to FIG. 17A, in the virtual game space 10, an ally character C2, an ally character C3, and an enemy character E1 are respectively arranged in arrangement positions 24, 26, and 14 in addition to a player character C1. Here, in the character range information table, in association with the player character C1, an arrangement coordinate of the player character C1 is stored as center coordinate information and F1 is stored as size information indicating the size of a range for determination of group formation. Therefore, in the virtual game space 10, a circle having a size F1 centering on the arrangement coordinate of the player character C1 is set as a range B1 for determination of group formation.

Next, a case in which the player character C1 or any one of the ally characters is moved (in particular, in FIG. 17A, the ally character C2 is moved) is explained. For example, an arrangement coordinate after the movement of the ally character C2 is received from a server device 200, whereby the arrangement coordinate of the ally character C2 moves from the arrangement position 24 to an arrangement position 25. As a result, the arrangement coordinate of the ally character C2 is included in the range B1 set for the player character C1. Therefore, the processor 112 stores the ally character C2 in association with intra-group character information of the character range information table. The player character C1 and the ally character C2 form a group.

Here, in this embodiment, as in the other embodiments, it is possible to change a range used for group determination according to the numbers and/or arrangement positions of other characters belonging to groups. In an example illustrated in FIG. 17A, the ally character C2 is present as another character within the range B1 set for the player character C1. Therefore, as illustrated in the character range information table in FIG. 15, a center position of a range is changed to a center position R1 of a line segment connecting the player character C1 and the ally character C2 and the size of the range is changed from F1 to F2. That is, as illustrated in FIG. 17A, the range used for group determination for the player character C1 is changed and expanded from the range B1 to a range B2.

Although not specifically illustrated, as illustrated in the character range information table in FIG. 15, the range for group determination is set for each of the characters. Therefore, a range set for the ally character C2 is also changed in the same manner as the range set for the player character C1.

Figure 17B:
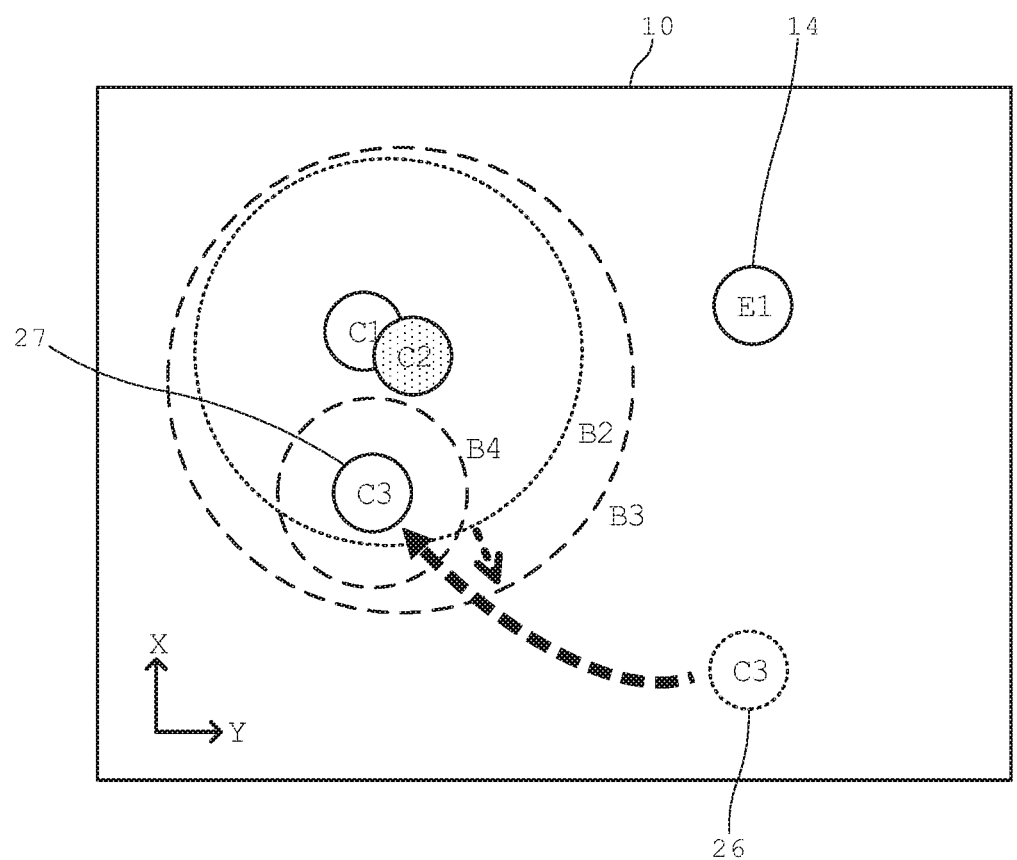
FIG. 17B is a diagram conceptually illustrating the virtual game space of the game application according to the sixth embodiment of the present disclosure.

FIG. 17B is a diagram conceptually illustrating the virtual game space of the game application according to the sixth embodiment of the present disclosure. Specifically, FIG. 17B is a diagram illustrating the virtual game space 10 in the case in which the ally character C3 is moved from a state illustrated in FIG. 17A. According to FIG. 17B, the ally character C3 arranged in the arrangement position 26 receives an arrangement coordinate after the movement of the ally character C3 from, for example, the server device 200, whereby the arrangement coordinate of the ally character C3 moves to the arrangement position 27. As a result, the ally character C3 is located within a range of the range B2 set for group determination for the player character C1. Therefore, the processor 112 stores the ally character C3 further in association with the player character C1 in the intra-group character information of the character range information table. The player character C1, the ally character C2, and the ally character C3 form a group.

Here, as explained above, it is possible to change the range used for group determination according to the numbers and/or arrangement positions of the other characters belonging to the groups. In an example illustrated in FIG. 17B, two characters, that is, the ally character C2 and the ally character C3 are present as the other characters within the range B2 set for the player character C1. Therefore, the processor 112 changes the center coordinate information of the character range information table to a center of gravity position of a polygon connecting the player character C1, the ally character C2, and the ally character C3. The processor 112 changes the size information of the character range information table from F2 to F3. That is, as illustrated in FIG. 17B, the range used for group determination for the player character C1 is changed and expanded from the range B2 to a range B3.

When focusing on the ally character C3, a character other than the ally character C3 is absent within a range B4 set as a range for group formation. Therefore, from the viewpoint of the player character C1, it is possible to form a group with the ally character C3 and obtain predetermined effects. On the other hand, from the viewpoint of the ally character C3, a group is not formed with the player character C1 and the predetermined effects cannot be obtained.

As explained above, in this embodiment, the range and the threshold used for the group determination can be set for each of the characters. The range can be flexibly changed according to the number and the positions of the characters belonging to the group. Therefore, in addition to the effects obtained by the first to fifth embodiments, it is possible to perform various group formation to form, for example, a group formed when viewed from one side but not formed when viewed from the other side.

Other Embodiments

In the first to sixth embodiments, the group is formed if the position condition and the time condition are satisfied between the character or the player and the group. However, in addition to these conditions, the number of characters or players forming the group may be further considered. That is, in the group information table of the memory 119, number information of the characters or the players already included in the group is stored in association with the group ID information. The processor 112 confirms number information of the formed group, for example, after determining in S107 in FIG. 6 whether the time condition is satisfied. The processor 112 determines whether the number information is smaller than a predetermined fourth threshold. When the number information is smaller than the fourth threshold, the processor 112 shifts to the group formation processing in S108 and subsequent steps. On the other hand, when the number information is equal to or larger than the fourth threshold, the processor 112 ends the processing without forming a group. Note that, when the number information is equal to or larger than the fourth threshold, the processor 112 may divides the characters or the players forming the group into a plurality of groups such that the number information decreases to a number smaller than the fourth threshold. In the processing relating to this division, the processor 112 may select characters forming groups after the division at random or may select characters based on ability value parameters such that, for example, offensive power and the like are equal among the groups after the division as much as possible.

In the first to sixth embodiments, the group is dissolved according to whether the distance between the character or the player and the group is within the predetermined range (for example, equal to or larger than the first threshold). However, in addition to this, the group may be automatically dissolved when the enemy character E1 is defeated by the combat. That is, the processor 112 determines whether a hit point of the enemy character decreases to zero according to the progress of the game application and, when the hit point decreases to zero, determines that the enemy character E1 is subdued, and generates an interrupt signal relating to the subdual. The processor 112 refers to the group information table and, when an existing group present within a predetermined distance from the enemy character is formed, deletes information of a group corresponding to group ID information of the group, and dissolves the group.

In in the case explained in the first to sixth embodiments, the terminal device 100 functioning as a processing device executes the processing of the game application according to these embodiments. However, instead of this, the server device 200 functioning as a processing device is also capable of executing these kinds of processing. That is, various kinds of information such as a character information table and a group information table are stores in the memory 211 in addition to the player information table. The server device 200 receives information relating to a moving instruction for a character detected by the input interfaces of the terminal devices and starts the processing in FIG. 6 and the like based on the information. The processor 212 of the server device 200 executes, in addition to the processing relating to the processing flows illustrated in FIG. 6 and the like, processing for transmitting, to the terminal devices 100, group formation information (for example, S110), group dissolution information (for example, S202), effect information (S112), and the like obtained by those kinds of processing.

In in the case explained in the first to sixth embodiments, one character belong to one group. However, in all the embodiments, if only the position condition and the time condition are satisfied, one character can naturally belong to a plurality of groups. That is, the determination concerning whether the distance between the characters is smaller than the first threshold in S106 in FIG. 6 is performed for, for example, all combinations of characters located in the virtual game space 10. Therefore, in FIG. 9A, when a character C5 is present on the opposite side of the character C2 centering on the player character C1 and both of the distance between the player character C1 and the character C2 and the distance between the player character C1 and the character C5 are smaller than the first threshold, the player character C1 belongs to both of the group G1 with the character C2 and a group with the character C5 (when the distance between the character C2 and the character C5 is larger than the first threshold, two groups are formed as explained above. However, when the distance is smaller than the first threshold, one group formed by three characters, that is, the player character C1, the character C2, and the character C5 is formed).

As explained above, in this embodiment, it is possible to obtain the same effects as the effects described in the first to sixth embodiments.

It is also possible to configure a system by appropriately combining the elements explained in the embodiments or replacing the elements.

The processing and the procedures explained in this specification can be realized by not only those explicitly explained in the embodiments but also software, hardware, or a combination of the software and the hardware. Specifically, the processing and the procedures explained in this specification are realized by implementing logics equivalent to the processing on a medium such as an integrated circuit, a volatile memory, a nonvolatile memory, a magnetic disk, or an optical storage. It is possible to implement the processing and the procedures explained in this specification as a computer program and cause various computers including a terminal device and a server device to execute the computer program.

Even if the processing and the procedures explained in this specification are explained as being executed by a single device, software, component, or module, such processing or procedures can be executed by a plurality of devices, a plurality of kinds of software, a plurality of components, and/or a plurality of modules. Even if the various kinds of information explained in this specification are explained as being stored in a single memory or storing unit, such information can be distributed and stored in a plurality of memories included in a single device or a plurality of memories distributed and disposed in a plurality of devices. Further, the elements of the software and the hardware explained in this specification can be realized by being integrated into a smaller number of components or disassembled into a larger number of components.

The processing device, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A processing device comprising:
an input interface configured to receive an instruction with respect to an arrangement position of a player character in a virtual game space, the player character being associated with a player;
a memory configured to store computer readable instructions, the arrangement position of the player character, an arrangement position of another character different from the player character in the virtual game space, and an arrangement position of an enemy character different from the player character and the another character in the virtual game space; and
a processor configured to execute the computer readable instructions so as to:
arrange the player character and the another character in the virtual game space based on the arrangement position of the player character and the arrangement position of the another character stored in the memory;
change the arrangement position of the player character to a first new arrangement position in the virtual game space when the input interface receives the instruction for a first movement of the player character;
update the arrangement position of the player character to the first new arrangement position and save the first new arrangement position of the player character in the memory; and
form a group including the player character and the another character when the player character and the another character are arranged within a predetermined range in the virtual game space and a distance between the enemy character and at least one of the player character or the another character is less than a predetermined value in the virtual game space after at least one of the arrangement position of the player character or the arrangement position of the another character is changed in the virtual game space.

2. The processing device according to claim 1, wherein the memory is configured to store respective ability values in association with the player character and the another character, and
when the group is formed, the processor is configured to change the ability value associated with at least one of the player character or the another character belonging to the group.

3. The processing device according to claim 2, wherein the ability values are changed to be advantageous for the player in a virtual game advanced in the virtual game space.

4. The processing device according to claim 1, wherein the group is formed when a predetermined period of time passes after the player character and the another character are arranged within the predetermined range.

5. The processing device according to claim 1, further comprising:
a communication interface configured to transmit and receive predetermined information to and from another processing device arranged in a remote place.

6. The processing device according to claim 5, wherein the arrangement position of the another character is received from the another processing device via the communication interface as the predetermined information.

7. The processing device according to claim 1, wherein the processor is further configured to:
change the first new arrangement position of the player character to a second new arrangement position in the virtual game space when the input interface receives the instruction for a second movement of the player character;
update the first new arrangement position of the player character to the second new arrangement position and save the second new arrangement position of the player character in the memory; and dissolve the group including the player character and the another character when the player character and the another character are arranged outside the predetermined range.

8. The processing device according to claim 1,
wherein two or more of the another characters are arranged in the virtual game space, and
the predetermined range is changed according to a number or the arrangement positions of the another characters belonging to the group.

9. The processing device according to claim 1,
wherein the processor is configured to change a size of the predetermined range in association with each of the player character and the another character.

10. A computer program product embodying computer readable instructions stored on a non-transitory computer-readable storage medium for causing a computer to execute a process by a processor, the computer including:
an input interface configured to receive an instruction with respect to an arrangement position of a player character in a virtual game space associated with a player; and
a memory configured to store the arrangement position of the player character, an arrangement position of another character different from the player character in the virtual game space, and an arrangement position of an enemy character different from the player character and the another character in the virtual game space,
the computer configured to perform the steps of:
arranging the player character and the another character in the virtual game space based on the arrangement position of the player character and the arrangement position of the another character stored in the memory;
changing the arrangement position of the player character to a new arrangement position in the virtual game space when the input interface receives the instruction for a movement of the player character;
updating the arrangement position of the player character to the new arrangement position and save the new arrangement position of the player character in the memory; and
forming a group including the player character and the another character when the player character and the another character are arranged within a predetermined range in the virtual game space and a distance between the enemy character and at least one of the player character or the another character is less than a predetermined value in the virtual game space after at least one of the arrangement position of the player character or the arrangement position of the another character is changed in the virtual game space.

11. A method for causing a processor in a computer to execute a process, the computer including:
an input interface configured to receive an instruction with respect to an arrangement position of a player character in a virtual game space, the player character being associated with a player; and
a memory configured to store computer readable instructions, the arrangement position of the player character, an arrangement position of another character different from the player character in the virtual game space, and an arrangement position of an enemy character different from the player character and the another character in the virtual game space,
the method comprising executing the computer readable instructions on the processor the steps of:
arranging the player character and the another character in the virtual game space based on the arrangement position of the player character and the arrangement position of the another character stored in the memory;
changing the arrangement position of the player character to a new arrangement position in the virtual game space when the input interface receives the instruction for a movement of the player character;
updating the arrangement position of the player character to the new arrangement position and save the new arrangement position of the player character in the memory; and
forming a group including the player character and the another character when the player character and the another character are arranged within a predetermined range in the virtual game space and a distance between the enemy character and at least one of the player character or the another character is less than a predetermined value in the virtual game space after at least one of the arrangement position of the player character or the arrangement position of the another character is changed in the virtual game space.

12. A processing device comprising:
a sensor configured to detect a present location of a player in a real space at a first time;
a communication interface configured to receive information relating to a present location of another player different from the player in the real space at a second time;
a memory configured to store computer readable instructions, information relating to the present location of the player detected by the sensor, the received information relating to the present location of the another player received by the communication interface, and an arrangement position of an enemy character different from the player character and the another character in a virtual game space; and
a processor configured to execute the computer readable instructions so as to:
arranging a player character associated with the player and another player character associated with the another player in the virtual game space based on the information relating to the present location of the player and the received information relating to the present location of the another player stored in the memory;
causing the sensor to detect a new location of the player in the real space at a third time when the player moves from the present location so as to update the present location of the player to the new location;
causing the communication interface to receive information relating to a new location of the another player in the real space at a fourth time when the another player moves from the present location so as to update the present location of the another player to the new location;
storing information relating to the new location of the player and information relating to the new location of the another player in the memory; and
forming a group including the player character and the another player character in the virtual game space when one of the present location or the new location of the player and one of the present location or the new location of the another player are present within a predetermined range in the real space and a distance between the enemy character and at least one of the player character or the another character is less than a predetermined value in the virtual game space.

\* \* \* \* \*